United States Patent
Morey et al.

(10) Patent No.: US 10,168,248 B1
(45) Date of Patent: Jan. 1, 2019

(54) VIBRATION MEASUREMENT AND ANALYSIS

(71) Applicant: Tensor Systems Pty Ltd, Hurstbridge, Victoria (AU)

(72) Inventors: John Adrian Morey, Hurstbridge (AU); James Edward Steward, Norman Park (AU)

(73) Assignee: Tensor Systems Pty Ltd, Hurstbridge, Victoria (AU)

( * ) Notice: Subject to any disclaimer, the term of this patent is extended or adjusted under 35 U.S.C. 154(b) by 457 days.

(21) Appl. No.: 14/671,697

(22) Filed: Mar. 27, 2015

(51) Int. Cl.
*G06F 19/00* (2018.01)
*G01M 13/02* (2006.01)
*G01M 13/04* (2006.01)

(52) U.S. Cl.
CPC ........ *G01M 13/021* (2013.01); *G01M 13/028* (2013.01); *G01M 13/045* (2013.01)

(58) Field of Classification Search
CPC . G01M 13/021; G01M 13/028; G01M 13/045
See application file for complete search history.

(56) References Cited

U.S. PATENT DOCUMENTS

2004/0200283 A1* 10/2004 Blunt ................. G01M 13/021
  73/593
2010/0012874 A1* 1/2010 Dolenti .............. G01M 15/046
  251/213

* cited by examiner

*Primary Examiner* — Changhyun Yi
(74) *Attorney, Agent, or Firm* — Quarles & Brady LLP

(57) ABSTRACT

A method of measuring and analyzing vibrations of a mechanical system, e.g., for performing gear and bearing fault detection within a system having a reference shaft and a plurality of rotating components. The method may include the steps of tabulating gear ratios of the plurality of rotating components relative to the reference shaft in integer form, establishing a measurement specification and communicating the measurement specification to a digitizer, recording vibration data from the mechanical system during operation, and resampling the recorded vibration data using the tabulated gear ratios to obtain vibration data corresponding to the rotating components and a vibration signature for a component of interest at predetermined angular increments.

20 Claims, 20 Drawing Sheets

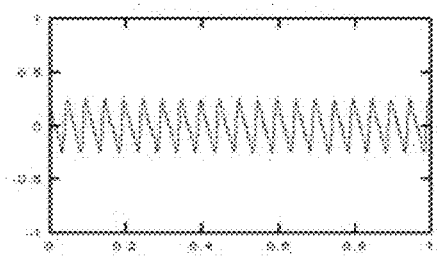
Figure 8A
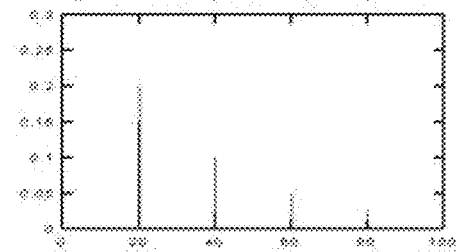
Figure 8B
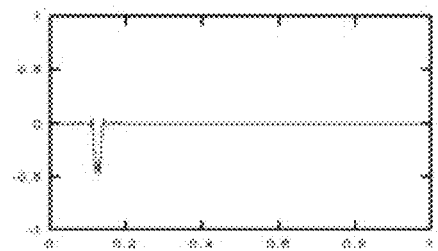
Figure 8C
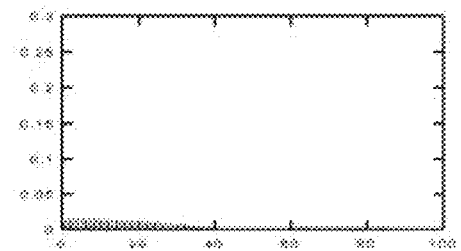
Figure 8D
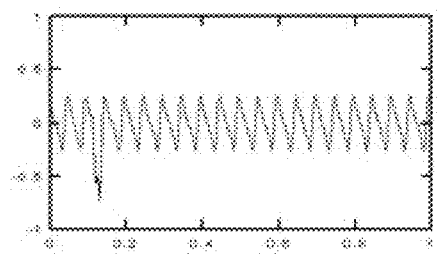
Figure 8E
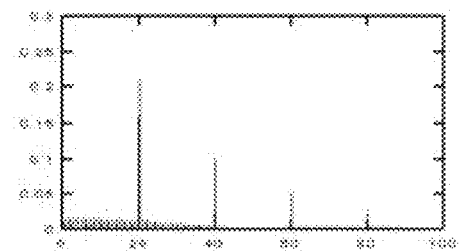
Figure 8F
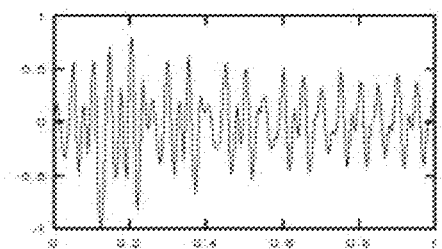
Figure 8G
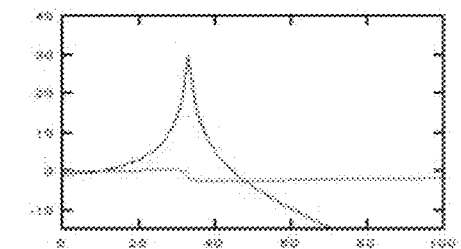
Figure 8H
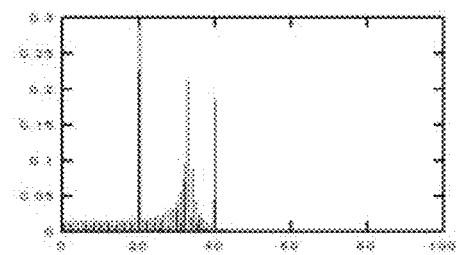
Figure 8I
Figures 8A – 8i

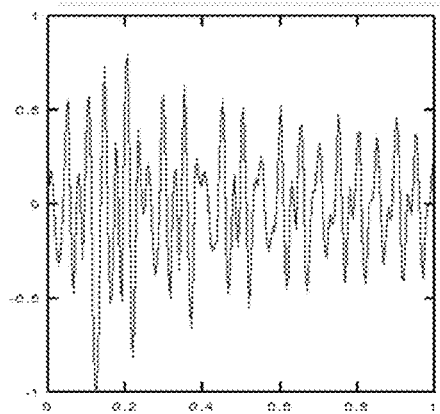
Figure 9A
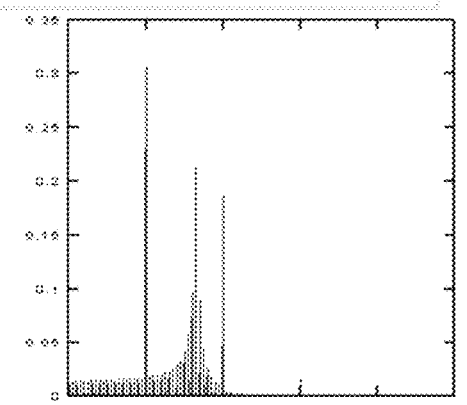
Figure 9B
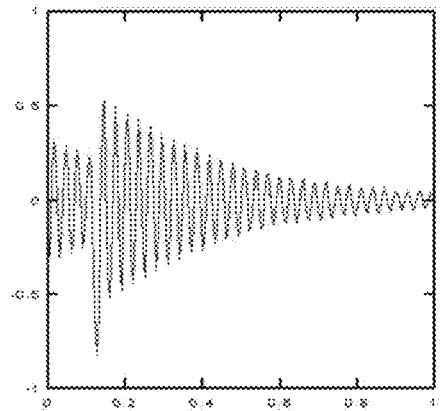
Figure 9C
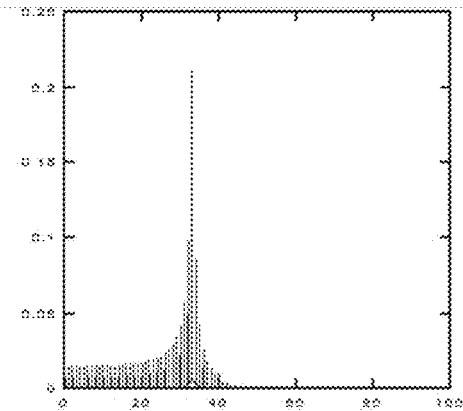
Figure 9D
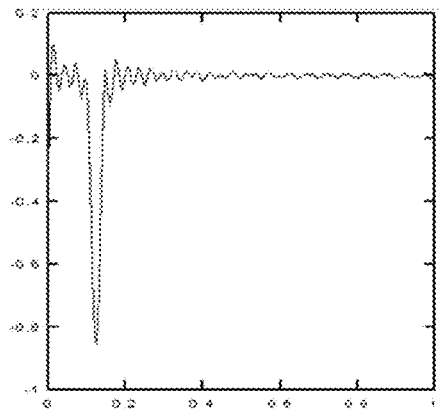
Figure 9E
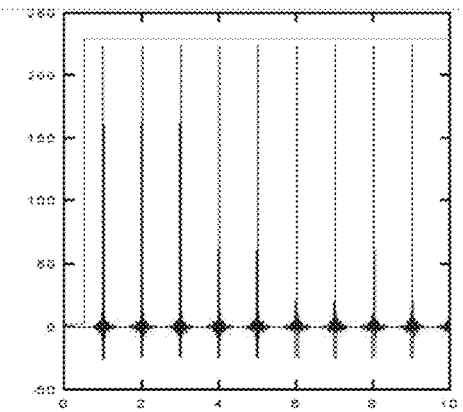
Figure 9F
Figures 9A to 9F

VIBRATION MEASUREMENT AND ANALYSIS

FIELD OF THE INVENTION

The present invention relates to a vibration measurement and analysis method and system, for example the method and system are operable for performing gear and bearing fault detection within a machine having elements under periodic motion or rotation.

BACKGROUND OF THE INVENTION

Complex machinery is critically important to the functionality of many modern industrial systems. Rotating machines, such as turbines, generators, motors and engines are particularly important due to their ability to facilitate the process of converting energy to work. To achieve this rotating machinery typically comprises, or are at least configured with, gear systems. These machines operate via the rotation of interconnected shafts with attached gears in order to drive a load. In applications involving large loads, such as ore crushes and bar mills, gears, shafts and other components within the machines are placed under extreme stress. Ensuring the efficient and safe operation of machines in these environments is essential in order to maintain safety and maximise productivity.

Preventing damage to rotating machinery involves the accurate identification and isolation of faults within the parts of a given machine. Gear boxes are particularly vulnerable to faults due to the high stresses exerted onto the individual tooth and bearing parts. In large and complex machines fault detection is difficult due to the size of the gears and a lack of physical access afforded to operators when the machine is in use. As there are often significant costs incurred when a machine is shutdown and disassembled, there is a need for methods which can accurately perform fault detection while the machine is operating, and without requiring physical access to the gear, bearing or shaft components.

A common approach to machine fault diagnosis involves the use of sensors to take measurements from a reference component, such as a rotating shaft, to which there is access. An analysis of the sensor measurements may be performed and an alarm may be raised to indicate a fault if the values from the set of metrics used exceed a 'safe' threshold limit. Measurement and analysis of vibration information offers a cost effective and non-destructive mechanism for performing fault detection on operating machinery. Vibration of a rotating shaft may be measured by a sensor, with the data measurements subsequently processed via frequency based methods such as spectral analysis, wavelet analysis, or Short-Time Fourier Transforms (STFTs). The results of the processing may be used to monitor the state of the individual gear or bearing components, even when these components cannot be directly accessed or observed.

Traditional vibration measurement and analysis techniques are characterised by the use of spectral based time-frequency analysis. These methods perform analysis based on the content of the spectrum, and particularly the harmonics of a shaft rotating at a given speed, to identify gear or bearing damage. However, previous methods of vibration analysis have generally failed to accurately and reliably detect faults in complex machines. The drawbacks of these past approaches include:
1. a reliance on a constant shaft speed, and
2. a tendency to search for gear and bearing artefacts within the same spectral components.

In practice the rotational speed of a machine may not be constant, due to the presence of start-up and shutdown phases, load variation or motor wandering during operation, and as a result the spectrum bandwidth varies leading to an inaccurate fault detection capability. If the signals measured include vibration from a number of separate parts operating under different conditions, then the presence of faults in one part may be masked by the normal operation of the others.

It is therefore desired to alleviate one or more difficulties of the prior art, or to at least provide a useful alternative.

SUMMARY OF THE INVENTION

According to a first aspect of the present invention there is provided a method of measuring and analysing vibrations of a mechanical system having a reference shaft and a plurality of rotating components, including the steps of:
 tabulating in integer form gear ratios of the rotating components relative to the reference shaft;
 establishing a measurement specification and communicating same to a digitiser, the measurement specification including a sample rate at which vibration data is to be recorded and operating conditions of the mechanical system that are to be met before vibration data pertaining to the mechanical system is recorded;
 recording vibration data from the mechanical system during operation; and
 resampling the recorded vibration data using the ratios defined in the specification table to obtain vibration data corresponding to the or each rotating component,
 wherein from the step of resampling there is obtained for analysis a vibration signature for a component of interest at predetermined angular increments.

According to preferred embodiments of the invention, the method further includes the step of tabulating a representation of virtual shafts for epicyclic gears. In one example, the virtual shaft gear ratio being calculated as the number of teeth on a ring gear, divided by the sum of the number of teeth on the ring gear and the number of teeth on the sun gear. The method can also include the step of tabulating the geometrical configuration of bearings in the mechanical system.

The recorded vibration data obtained can include time-domain information relating to the loading, number of revolutions, velocity, acceleration and displacement of the reference shaft.

Preferably, when the mechanical system is periodically loaded the measurement specification is configured so that the digitiser captures data corresponding to the system when loaded so as to capture data for a predetermined number of turns of a shaft of interest to be analysed. The measurement specification can be configured to capture data corresponding to a predetermined number of turns of a shaft of interest.

Preferably, the step of resampling is performed for each rotating component in the mechanical system. The method can further include the steps of fitting a tachometer to a reference shaft of the mechanical system, fitting a load sensor to the system and fitting at least one vibration sensor, for example an accelerometer, to the mechanical system. The vibration data may be relayed to a PC for analysis.

Preferably, the measurement specification includes operating conditions for the mechanical system and once the load conditions are satisfied and a predetermined number of turns of the reference shaft have passed, the digitiser:
 acquires data samples for a predetermined number of turns of the reference shaft based on the measurement specification and the gear ratio of the shaft of interest;

acquires at least 256 data samples on each end of the recorded data to fill digital filtering buffers; and checks that the load conditions are still above a predetermined level at an end of sampling.

The step of resampling can include resampling sampled time-domain signal data to generate resampled signals with a fixed number of data points per revolution of a shaft to be analysed. Preferably, the resampling is performed by:

the application of an approximation function to a position map of the reference shaft to produce a series of resample time instants within the interval of one revolution of a shaft to be analysed, from a set of values obtained from measured signal values obtained over a plurality of revolutions of the shaft to be analysed; and the interpolation of the resampled signal value at each of the resample time instants.

The method can further include the step of performing a Fast Fourier Transform (FFT) on the recorded data. The method can further include a step of aligning the recorded data between channels within the digitiser. The method can further include a step of aligning the data between sets of recorded data.

Aligning the data set can further include a step of performing a FFT, rotating each spectral line by the number of radians required to align the current data set with the first data set and performing an inverse FFT to obtain time domain aligned data.

The step of recording vibration data can include a subroutine for checking operation of sensors within predetermined operating conditions, the subroutine including the steps of:

integrating an acceleration waveform of the measured data to velocity to amplify transient oscillations of the waveform;

filtering the signal in the time domain using a two pole Butterworth filter or a drift filter to reduce the resulting transients;

applying a damped exponential filter function to further remove the transients; and differentiating the waveform to return it to an acceleration waveform.

Checking operation of the sensors can include the following steps:

check dc bias of specified signals and reject as needed;

check general waveform slope;

for final acceleration data, check median filter centre line for divergence from a straight line;

integrate to velocity depending on the measurement specification;

check velocity spectrum for low frequency noise in a predetermined range, i.e. up to 3 Hz; and calculate the rms level in this range and compare to limits in the measurement specification.

These steps may be repeated on failure to satisfy predetermined conditions.

Preferably, the method further includes the step of isolating vibrations from a rotating component to be analysed by removing from the waveform components corresponding to vibrations of multiple components on a single shaft, including the steps of:

obtaining a vibration waveform of the mechanical system and performing a FFT operation on the waveform;

identifying a gear for which the harmonics are to be removed; and removing or minimising to the background level of the spectrum those harmonics.

The multiple components can be gears having different numbers of teeth. The method can further include the step of removing sidebands of the identified component.

The method can further include a subroutine of retrieving a force waveform from a vibration response waveform, including the steps of:

identifying gear meshing harmonics from a spectrum of a gear meshing forcing function;

obtaining a system response spectrum;

deleting gear meshing harmonics from the system response spectrum;

applying a Cepstrum filter to the resulting spectrum to remove components corresponding to system response; and performing an inverse FFT operation to obtain a waveform of a forcing impulse.

The method can further include the step of identifying a rotating component fault in a waveform, including:

trending a FM4 peak to peak value of the waveform; and triggering an alarm once the trended value exceeds a predetermined level.

The waveform can be a displacement, velocity, acceleration or demodulated acceleration waveform. The method can further include the generation of one or more analysis metrics by averaging the sampled signal data values, for a shaft of interest, over a fixed number of turns of the shaft of interest.

According to another aspect of the present invention there is provided a method of measuring and analysing vibrations of a mechanical system having a reference shaft and a plurality of rotating components, including the steps of:

tabulating in integer form gear ratios of the rotating components relative to the reference shaft;

establishing a measurement specification and communicating same to a digitiser, the measurement specification including a sample rate at which vibration data is to be recorded and operating conditions of the mechanical system that are to be met before vibration data pertaining to the mechanical system is recorded;

recording vibration data from the mechanical system during operation; and identifying synchronous and non-synchronous components from sampled signal values via harmonic analysis.

According to another aspect of the present invention there is provided a method of creating a specification table for use in a method of measuring and analysing vibrations of a mechanical system, including the steps of:

establishing and tabulating in integer form parameters of rotating components of the mechanical system, the parameters including physical properties and type of each component, gear configuration, bearing configuration and the relationships between the rotating components within the system.

The step of tabulating parameters of rotating components can include tabulating a virtual representation of shafts for epicyclic gears, the virtual shaft gear ratio being calculated in one example as the number of teeth on a ring gear, divided by the sum of the number of teeth on the ring gear and the number of teeth on the sun gear.

According to another aspect of the present invention there is provided a method of recording vibration data for a periodically loaded machine, including the steps of:

communicating a required measurement specification to a digitiser from a PC, the measurement specification including a required sample rate and operating conditions of the mechanical system that are to be met before data pertaining to the mechanical system is recorded;

once load conditions are satisfied and a predetermined number of turns of the reference shaft has passed, acquire data samples for a predetermined number of turns based on the communicated measurement specification and the gear ratio to the shaft of interest;

acquire a minimum 256 data samples on either end of the recorded data for digital filtering buffers; and check the load is still above a transition level at end of sampling.

According to another aspect of the present invention there is provided a method of analysing the accuracy of sensors, including the steps of:

integrating an acceleration waveform of measured data to velocity to amplify the transient oscillation;

filtering the signal in the time domain using for example a standard two pole Butterworth filter or a drift filter to minimize the resulting transients;

applying a damped exponential filter function to further remove the transients; and differentiating the waveform to return it to acceleration.

The damped exponential filter function may be in the form $Y=b*e^{\wedge}(-at)*\sin(w*t)$.

The waveform may be differentiated using a function of the form:

$$x(0 \ldots N-1) = \{x[n] = y[n] \text{ when } n = 0$$
$$\{x[n] = y[n] - y[n-1] \text{ for } n = 1 \ldots N-1$$

The settling time may be reduced and the initial transient response removed so that the filter initial response can be effectively removed from a finite length data set.

According to another aspect of the present invention there is provided a method of resampling recorded vibration data, including the step of:

manipulating recorded vibration data to obtain a vibration signature for a component of interest at predetermined angular increments based on a defined physical relationship between the component of interest and a reference shaft, wherein the data is time-domain signal data and the method generates resampled signals with a fixed number of data points per revolution of the component of interest.

The resampling may be performed by:

the application of an approximation function to a speed map to produce a series of resample time instants within the interval of one revolution of the shaft of interest, from a set of average values obtained from measured signal values obtained over a plurality of revolutions of a shaft of interest; and the interpolation of the resampled signal value at each of the resample time instants using an interpolation function.

The approximation function can be a Hermite spline fit. Interpolation of the resampled values can be performed using a band-limited sine function, where said function has a bandwidth that varies dynamically based on the speed of the shaft of interest.

Re-alignment of the resampled data of a measured signal for a reference shaft can be performed with respect to a shaft of interest, by using the gear ratio of the reference shaft to the shaft of interest.

The sampled data of a measured signal for one or more revolutions of a shaft of interest can be at least partially formed from copying sample data from the measured signal for the preceding one or more revolutions of the shaft of interest, and where the copied sample data values are selected based on a conceptual circular buffer.

Preferably, the processing of measured data involves resampling sampled time-domain signal data to generate resampled signals with a fixed number of data points per revolution of the shaft of interest.

According to another aspect of the present invention there is provided a method of averaging vibrations caused by gear tooth profile or individual tooth faults for each gear in a gearbox, including the steps of:

obtaining a vibration waveform and performing a FFT operation on the waveform;

identifying a gear for which the harmonics are to be removed; and removing or minimising to the background level of the spectrum those harmonics.

The method can further include the step of removing sidebands of the identified component. Preferably, other components not helpful to a clear TSA waveform can be removed. Preferably, orders corresponding to 300 Hz vibrations can be removed.

According to another aspect of the present invention there is provided a method of retrieving a force waveform from a vibration response waveform, including the steps of:

identifying gear meshing harmonics from a spectrum of the gear meshing forcing function;

obtaining a system response spectrum;

deleting the gear meshing harmonics from the system response spectrum;

applying a Cepstrum filter to the resulting spectrum to remove system response; and performing an inverse FFT operation to obtain a waveform of the forcing impulse.

According to another aspect of the present invention there is provided a method of identifying a rotating component fault in a waveform, including the steps of:

trending a FM4 peak to peak value of the waveform; and triggering an alarm once the trend value exceeds a predetermined level.

Preferably, the waveform is a displacement, velocity, acceleration or demodulated acceleration waveform.

According to another aspect of the present invention there is provided a method of generating analysis metrics corresponding to vibrations of a mechanical system, including the steps of: averaging of sampled signal data values, for a shaft of interest, over a fixed number of turns of the shaft of interest.

Preferably, the generation of one or more analysis metrics involves identification of synchronous and non-synchronous components, from sampled signal values via harmonic analysis.

Preferably, the harmonic analysis involves:

obtaining a representation of the frequency content of the one or more sampled signals;

identifying a plurality of harmonic values within the said frequency content representation; and labelling the harmonic values as synchronous or non-synchronous based on the location of each harmonic over the frequency representations for all the sampled signals.

The method can include identifying a plurality of harmonic values within the said frequency content representation of the one or more sampled signals involves:

calculating the spectrum of the one or more sampled signals;

determining the locations of all harmonics within the one or more sampled signal spectra for the shaft of interest; and identifying spectral lines that correspond to each respective harmonic within the spectra of one or more sampled signals for the shaft of interest.

Preferably, determining the locations of all harmonics within the one or more sampled signal involves employing a spectral peak based estimation technique to find the first harmonic location, the spectral peak based estimation technique including:

identifying the highest spectral line in the spectrum of a signal;

searching for a candidate first harmonic line prior to the peak, where said candidate line has an amplitude at least equal to a specified minimum percentage of the peak spectral value;

selecting a high frequency estimation line located at a multiple of the frequency of the candidate harmonic value, and whereby this spectral line has amplitude exceeding a minimum spectral amplitude threshold; and tracing back from the estimation line to accurately find the value of the first harmonic.

Preferably, identifying spectral lines that correspond to each respective harmonic for the shaft of interest involves applying a weighting function to select 2 or 3 spectral lines corresponding to each harmonic. Preferably, a Hanning weighting function is applied.

Preferably, the 2 or 3 spectral lines corresponding to each harmonic are selected according to the difference between the harmonic frequency and the spectral line frequencies, where the spectral lines considered in the selection include the two or three spectral lines with frequency values closest to the harmonic frequency.

Preferably, the generation of analysis metrics involves the selection of either synchronous or non-synchronous components in a frequency representation of a sampled measurement signal, and the conversion of the said frequency representation to a time-domain representation.

Preferably, generation of a time-domain representation from a frequency representation containing synchronous or non-synchronous components proceeds following the removal of specific frequency content relating to a shaft of interest from the said frequency representation.

Preferably, the generation of analysis metrics involves:

the selection of synchronous components in a frequency representation of a sampled signal;

the generation of a time-domain representation of the selected synchronous components; and the summation of a plurality of values from the time-domain signal.

Preferably, the generation of analysis metrics involves the removal of the fundamental shaft frequency, the first and second shaft harmonics, and the tooth mesh frequency and all its harmonics from a set of synchronous components, and the production of the fourth moment about the mean of the residual time-domain signal, divided by the square of the average variance of all time-domain residual signals.

Preferably, the generation of analysis metrics involves the removal of the fundamental shaft frequency, the first and second shaft harmonics, and the tooth mesh frequency and all its harmonics, and the +/−1 sidebands of each shaft and TMF harmonic from a set of synchronous components, and the production of the fourth moment about the mean of the time-domain difference signal, divided by the square of the variance of the time-domain difference signal.

Preferably, the generation of analysis metrics involves isolation of the gear meshing frequency and one or more sidebands, and the averaging of the first order sidebands.

Preferably, the generation of analysis metrics involves isolation of the gear meshing frequency and one or more sidebands, and the summation of the amplitudes of the said isolated sidebands normalized by the RMS value of the synchronous time average.

Preferably, the generation of analysis metrics involves obtaining a synchronous time average (STA) signal, as calculated by transforming to the time-domain a frequency representation of only the synchronous spectral components, and producing the RMS value of the said instantaneous STA after subtraction of the mean STA value.

Preferably, gear faults are identified on a shaft of interest using a set of analysis metrics, where each metric within the said set is synthesised from synchronous components of the frequency representations of the one or more sampled signals.

Preferably, bearing faults are identified on a shaft of interest using a set of analysis metrics, where each metric within the said set is synthesised from non-synchronous components of the frequency representations of the one or more sampled signals.

Preferably, gear or bearing faults are identified by comparing one or more analysis metric values to one or more threshold values, the threshold values providing an indication of the limit of nominal behaviour of the mechanical system.

Operation of the above method can result in the sounding of an alarm or other means to alert a user to a fault or a potential fault.

According to another aspect of the present invention, there is provided a vibration measurement and analysis system for a mechanical system having a reference shaft and a plurality of rotating components including:

one or more sensors attached to the reference shaft for recording vibration measurements of the system, the vibration measurements being represented by one or more signals;

a data collection device for recording in integer form gear ratios of the rotating components relative to the reference shaft and for recording the signals with reference to the recorded gear ratios;

an automated analysis and display device for generating one or more analysis metrics from the signals, the device being configured to obtain vibration information for a shaft of interest based on the vibration measurements with reference to the recorded gear ratios;

using sets of the analysis metrics to identify the presence of gear or bearing faults within the rotating components of the mechanical system, for which the signals are recorded; and a transmission medium for the transmission of the signals to at least one of the digitiser unit and the automated analysis and display system.

Preferably, the one or more sensors include a load sensor, a tachometer, and an accelerometer or proximity probe. The one or more sensors can transmit signals to the digitiser using a wired medium.

Preferably, the data collection device includes at least one database system, the said database systems operable to perform the storing and transmitting of configuration and measurement signal data for a mechanical system.

Preferably, the at least one database is accessible via a first communications device, said first communications device operable to send and receive configuration and measurement signal data to and from a second communications device.

Preferably, the digitisation unit is configured to:
receive, from one or more sensors, a plurality of input signals representing measurements of the one or more reference shafts of a mechanical system;
select one or more of the input signals, where the said selection includes signals representing measurements of at least one reference shaft of a mechanical system; and
process the selected at least one input signals to generate one or more output signals.

Preferably, the generation of the one or more output signals involves performing sampling of the selected one or more input signals. Preferably, the generation of the one or more output signals is dependent on a plurality of activation conditions.

Preferably, the digitisation unit includes a multiplexer to perform the selection of the one or more of the input signals associated with a reference shaft of the mechanical system.

Preferably, the digitisation unit includes circuits and/or components to perform analogue-to-digital conversion. Preferably, the digitisation unit includes circuits and/or components to count a number of pre-determined events occurring within intervals bound by successive events of an input signal.

Preferably, the digitisation unit includes a Xilinx chip to count a number events of a clock, the clock of a known clock rate, occurring within intervals bound by successive events of an input signal.

Preferably, the automated analysis and display device includes:
a microprocessor configured to execute computer-executable instructions in a memory associated with the generation of one or more analysis metrics from signals representing measurements of a shaft of the mechanical system, and with the use of the said one or more analysis metrics to identify the presence of gear or bearing faults within the gear or bearing components of a said shaft; and
a graphical display configured to display an indication of the one or more analysis metrics for the purpose of identifying the presence of gear or bearing faults within the gear or bearing components of a shaft of the mechanical system.

According to another aspect of the present invention there is provided, a computer-implemented program comprising a computer readable medium, embodying computer program code for causing a computer to execute a method of the above described type.

BRIEF DESCRIPTION OF THE DRAWINGS

Preferred embodiments of the invention will be further described, by way of non-limiting example only, with reference to the accompanying drawings in which:

FIGS. 8A to 9F illustrate different stages of a process of retrieving a force waveform from a vibration response waveform

FIG. 24 is a user interface for modifying alarm levels; and

Figures 28, 29:
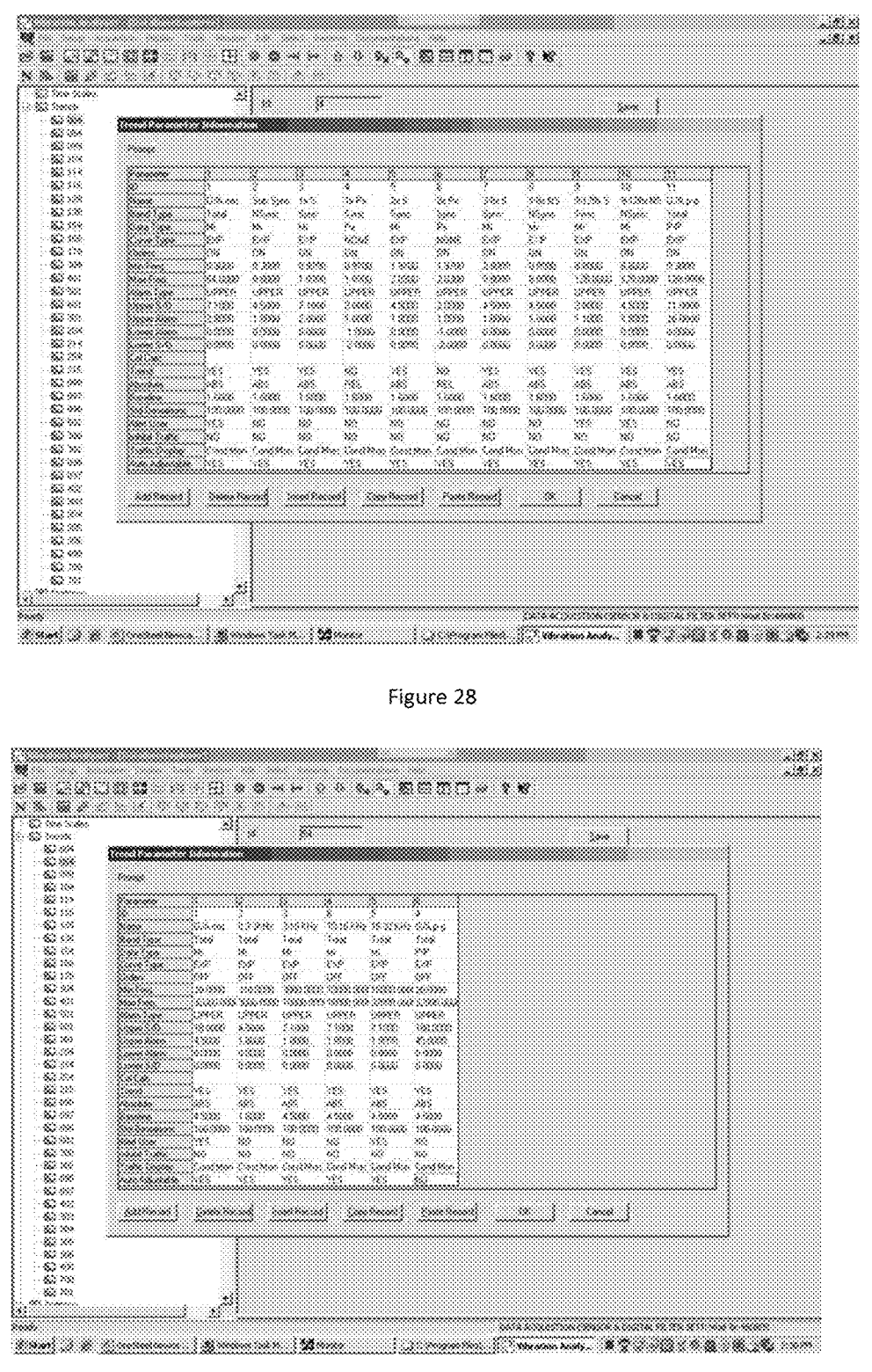

FIGS. 25 to 30 illustrate further parameter bands for vibration levels.

DETAILED DESCRIPTION

According to a preferred embodiment of the invention, there is described herein a vibration measurement and analysis method for advance fault detection of rotating components, such as gears and bearings. The method utilises signals from various sensors, such as load, speed and direction sensors, vibration and displacement sensors, fixed to one or more reference shafts, to record vibration for analysis. The method may include characterisation of gear meshing and bearing vibration through a separation of synchronous and non-synchronous components.

According to a preferred embodiment of the invention the method includes the steps of: establishing and tabulating in integer form parameters of rotating components of the mechanical system in a specification table, the parameters including type, gear configuration, bearing configuration and the relationships between the rotating components within the system; establishing a measurement specification and communicating same to a digitiser, the measurement specification including a required sample rate and operating conditions of the mechanical system that are to be met before data pertaining to the mechanical system is recorded; recording vibration data from the mechanical system during operation; and resampling the recorded data using the relationships defined in the specification table to obtain vibration data corresponding to a non-reference shaft, wherein from the step of resampling there is obtained a vibration signature for a component of interest at predetermined angular increments on a shaft of interest.

The method includes the steps of attaching sensors to a mechanical system, collecting data, performing an automated data analysis, which may involve the application of a Time Synchronous Averaging process for the extraction of synchronous and non-synchronous vibration information, and generating condition indicators or fault reports that may indicate a fault or potential fault. In the event that the magnitude of a condition indicator(s) is trending upwards then the analysis may result in an alarm being raised, the alarm being in the form of an audible or visual alarm at the machine or at a processing centre, or an email, SMS or similar electronic communication being generated and sent to an analyst.

Figure 1:
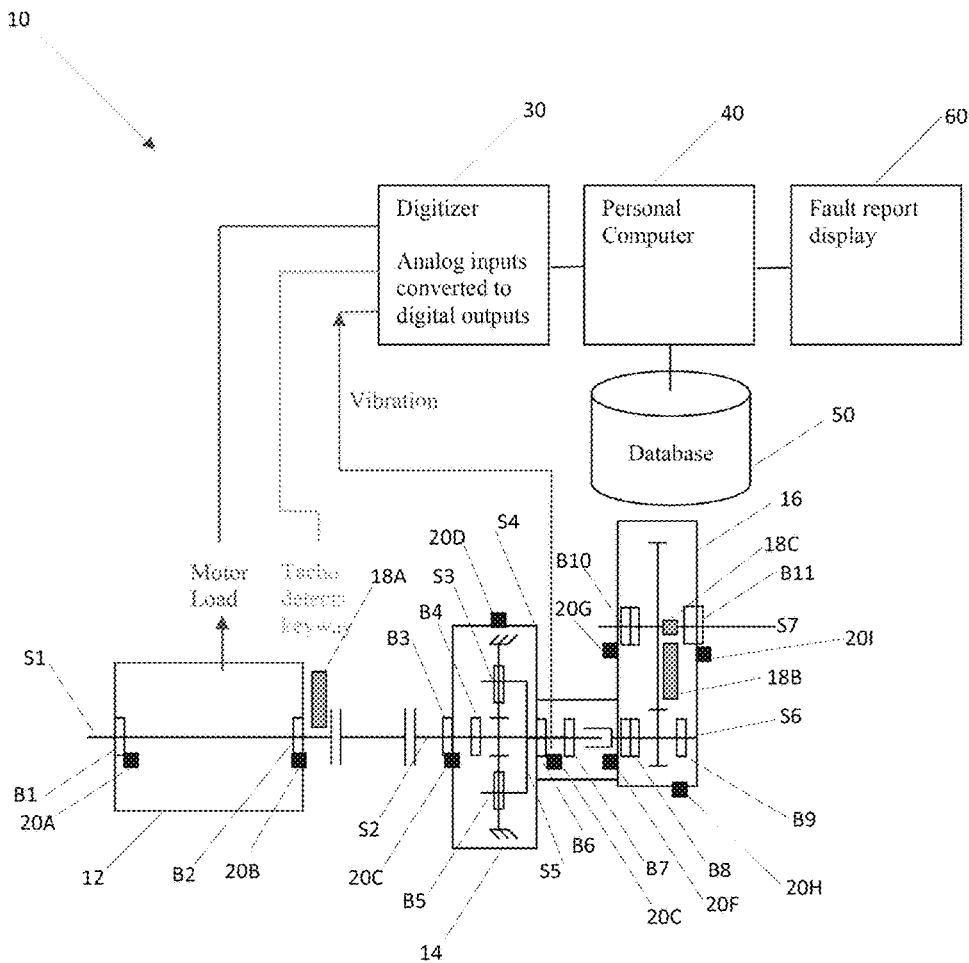
FIG. 1 is a schematic diagram of a mechanical system on which the vibration analysis method can be performed.

With reference to FIG. 1, there is shown a mechanical system 10 on which the described method can be implemented. The mechanical system 10 of FIG. 1 includes a plurality of shafts/gears S1, S2, S3, S4, S5, S6, S7, a plurality of bearings B1, B2, B3, B4, B5, B6, B7, B8, B9, B10, B11 at ends or midpoints of the shafts. Damage or wear of any one of these components can potentially be the source of excessive or changing vibrations that can indicate that a component failure is approaching.

In the illustrated system 10, a motor 12 rotates an input shaft S1 at 20 Hz. The input shaft S1 is mounted on bearings B1 and B2. The motor 12 is coupled to an epicyclic gearbox 14 that includes a sun gear S2 having 21 teeth and that also rotates at 20 Hz and is mounted on bearings B3 (type 36024) and B4 (type 46224). The epicyclic gearbox 14 also includes a planet gear S3, which rotates around sun S2, has 87 teeth and which is mounted on bearing B5 (type INA SL 182215). The planet S3 rotates within fixed ring S4 having 195 teeth and which does not rotate. Carrier S5, which supports planet S3, is mounted on a pair of bearings B5 (type 6NJ244 and 7NCF 2956 V).

The resulting gear ratio of epicyclic gearbox 14 is thus 10.286:1, with a tooth meshing frequency of 379.17 Hz. Accordingly, the planet S3 will rotate at −2.41 Hz and carrier S5 will rotate at 1.944 Hz.

The mechanical system 10 also includes a conventional gearbox 16 having a ratio of 4.895:1. The input shaft S6 of gearbox 16 is mounted on bearings B8 and B9 (type 32040, 24038) and will rotate at the carrier speed (S5) of 1.944 Hz. Input shaft S6 has 19 teeth so that a third tooth meshing frequency will be 36.936 Hz. Input shaft S6 drives a mating gear with 93 teeth and in turn rotates output shaft S7, which is mounted on bearings B10, B11 (type 32048, 23144) at 0.3972 Hz. This provides for an overall approximate decimal ratio for the system 10 of 50.3472:1. This ratio can be expressed in the exact integer ratio of (133/6696):1. For the sake of accuracy, it will be appreciated by those skilled in the art that it is highly desirable to maintain the ratio in integer form to prevent rounding errors.

The mechanical system 10 includes a plurality of sensors for measuring performance of the system 10, including displacement sensors 18a, 18b, 18c and acceleration sensors 20a, 20b, 20c, 20d, 20e, 20f, 20g, 20h, 20i. The mechanical system 10 is in communication with a digitiser 30, a personal computer (PC) 40, a database 50 and a fault report display 60.

A tachometer, accelerometer, and load sensors are employed to measure frequency vibration signals. The skilled person in the art will appreciate that many variations may exist with respect to the properties and type of sensor devices used to obtain the displacement, acceleration and load signals. In the presence of such variations, the principles and methods of the described embodiments are equally applicable.

The sensors produce output signals received by the digitiser 30. Transmission of the sensor signals to the digitiser is achieved in this embodiment through the physical (i.e. wired) connection of each sensor from their position on the reference shaft to the digitiser unit. Alternative embodiments may utilise wireless sensors wherein the signals output from the sensors are transmitted to a remote receiver, which subsequently delivers the signals to the digitiser.

Figure 5:
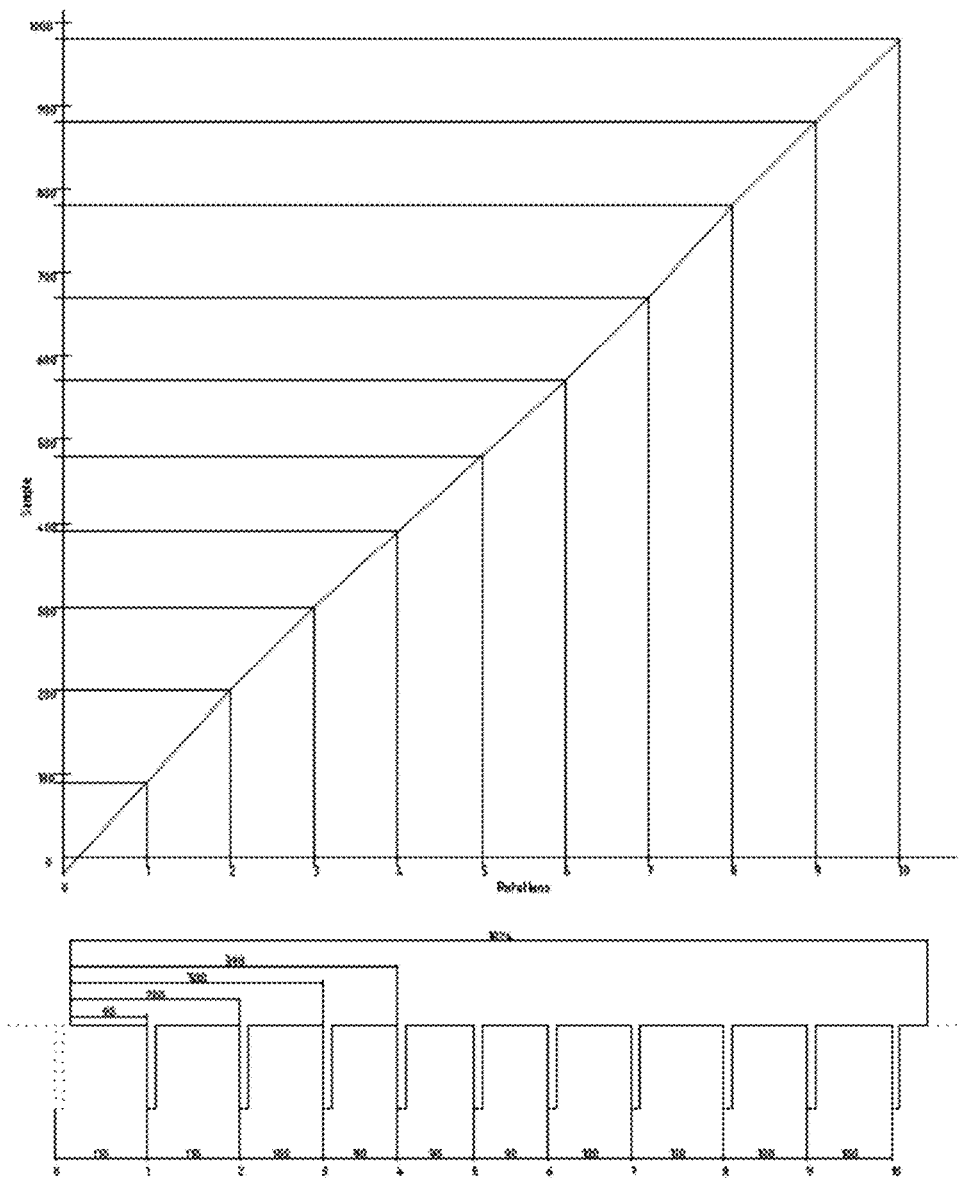
FIG. 5 is a plot of speed data obtained from a tachometer fitted to the mechanical system.

The sensors can perform measurement of the speed, load, displacement and acceleration (later integrated to velocity) of a reference or other shaft and other components in the system 10. Analogue sensor signals are processed for collection and analysis by the digitiser 30. The digitiser 30 of the present embodiment is shown in FIG. 5, and includes a multiplexer 31 for selecting between sets of input sensors associated with different shafts, an analogue-to-digital converter 32, and a Xilinx counter chip 33. Multiplexer 31 possesses K select lines allowing data to be collected from a maximum of $2^K$ shafts, each configured with a set of independent sensors. Selection of a reference shaft i via the multiplexer 31 results in the tachometer, accelerometer and load sensor signals $T_i$, $A_i$, and $L_i$ from shaft i becoming active for digital signal processing. With a 32 channel ADC chip there could be 1 tachometer, 1 load sensor and 30 accelerometers Ai being simultaneously sampled. Analogue-to-digital converter (ADC) unit 32 performs 24 bit ADC at a fixed sampling rate $f_s$ to produce sampled sensor signals $<T_i>$, $<A_i>$ and $<L_i>$ respectively. The digitiser uses decimation to reduce the ADC sampling frequency $f_s$ to a rate that sampling frequency $f_s$ is chosen dynamically based on the present speed of reference shaft i, where $f_s$ is chosen from a discrete set of frequencies such as to allow sampling of the sensors with oversampling of $N_b$ buffer samples. The digitiser performs sampling only when a plurality of activation conditions are met. In the described embodiment, the conditions are defined as 1) when the shaft speed exceeds 49.8 Hz, and 2) when the load sensor value represents a load in excess of 60% of peak load. The load must remain high during sampling, and when sampling ceases the digitiser checks $L_i$ to determine if the load is still high. If the load is not high, it is assumed that a de-loading event occurred during the sampling interval and the data is discarded. The quality control process may request that the measurement be performed again, depending on the outcome.

The Xilinx chip 33 monitors the tachometer sensor input $T_i$, for shaft of reference i. With reference to a 64 MHz internal clock, the Xilinx chip 33 records the number of clock counts elapsed between tachometer signal pulses. The ADC 32 produces a digitised accelerometer vibration signal $<A_i>$ of $N=1024+2*N_b$ samples per tachometer pulse corresponding to one revolution of the reference shaft, with blocks of $N_b$ samples included at either end as a buffer. In this embodiment 1024 samples are used to provide adequate resolution in the FFT domain while maintaining an efficient collection process. $N_b$ is set to 256 samples. The Xilinx chip 33 produces a count signal $C_i$ giving the integer number of clock pulses counted during the duration of each shaft revolution.

The digitised sampled signals are measured with respect to shaft i. However, fault determination must also be possible for a non-reference shaft, despite the fact that the sampled data will correspond to different rotational locations on these other shafts. Using configuration database 50 which records details of individual shafts, the sampling rate required to measure the vibrations occurring in a non-reference shaft i may be determined.

The sample rate $f_s$ of the digitiser 30 is determined by the desired number of samples after resampling $N_s$, and the number of orders $N_{ord}$ (i.e. the resolution) of the spectrum. To determine the sample rate the digitiser 30 first multiplies the desired on screen orders $N_{ord}$ by 2.56 to produce the orders bandwidth. For example, to display $N_{ord}$=100 orders, sampling is required at $N_{ord} \times 2.56 = 256$ samples per turn of the shaft of interest. The digitiser 30 measures the input shaft speed (in Hz or revs per second), and uses the gear ratio (obtained from the PC 15) to determine how many samples per second are required to achieve the desired number of samples per turn. For example, if the input shaft is rotating at 20 Hz and the gear ratio is 10:1, sampling at $N_{ord} * 20 * (1/10) = 256 * 20 * (1/10)$, and so $f_s = 512$ samples per second. Once the sample rate is determined, the number of full turns of the input shaft may be calculated as $(N_s/N_{ord})*(10/1) = (4096/256)*(10/1)$, which corresponds to $N_{turns} = 160$ as the minimum number of full turns of the input shaft. Non-integer numbers of turns are rounded up because the digitiser can't measure part turns. In the described embodiment, the digitiser 14 automatically adjusts the data buffer size to accommodate the required $N_{turns}$ plus the additional $N_b$ buffer sample data, up to the limit of the memory available.

The set of sampled digital signals $<T_i>$. $<A_i>$, $<L_i>$, the corresponding clock pulse count signal $C_i$, and the shaft number i are passed to the PC 40 for recordal within the vibration analysis software program. Once vibration data has been recorded, an automatic data analysis process can be initiated. Although illustrated as being automatic, it will be appreciated that the process may also be manually performed and that the analysis may not be performed by a computer at the same location as the mechanical system. Such an arrangement may be useful where the machine to be monitored is at a remote location.

Specification Table

Figure 3:
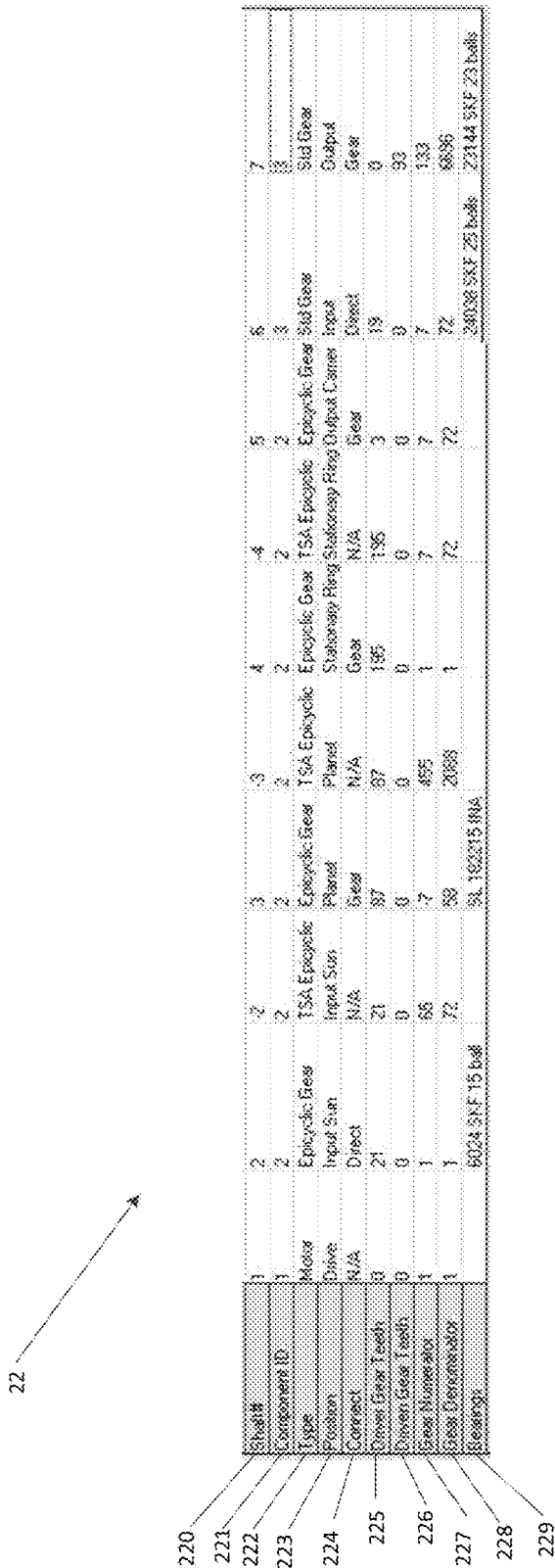
FIG. 3 is an example of a specification table used in the method.

With reference to FIG. 3, a specification table 22 is shown. The specification table 22 is used to document the mechanical system so that the relationships between rotating components can be expressed in integer form. The importance of this will become further apparent as the method is described further.

For continuously operating simple machines running at a known constant speed with very little wander, a Fast Fourier Transform (FFT) frequency analysis of vibrations is straightforward by specifying a suitable number of FFT lines and an appropriate frequency range as there is no sample time limitation. For more complex machines with more than one shaft, speed variation, and wander during a measurement, analysis of vibrations is more complex to obtain accurate results. To enable vibrations of the mechanical system 10 to be accurately analysed, the inventors have found it to be critically important to document the rotating components of the mechanical system 10 within a table so that the analysis can be performed with integer values. In this regard, by specifying the gear ratios in numerator/denominator form, it is possible to calculate the exact speed of each shaft in the system 10 relative to the tachometer shaft. Previous analysis systems have used gear ratios in decimal form, which results in errors of increasing magnitude being introduced.

Figure 2:
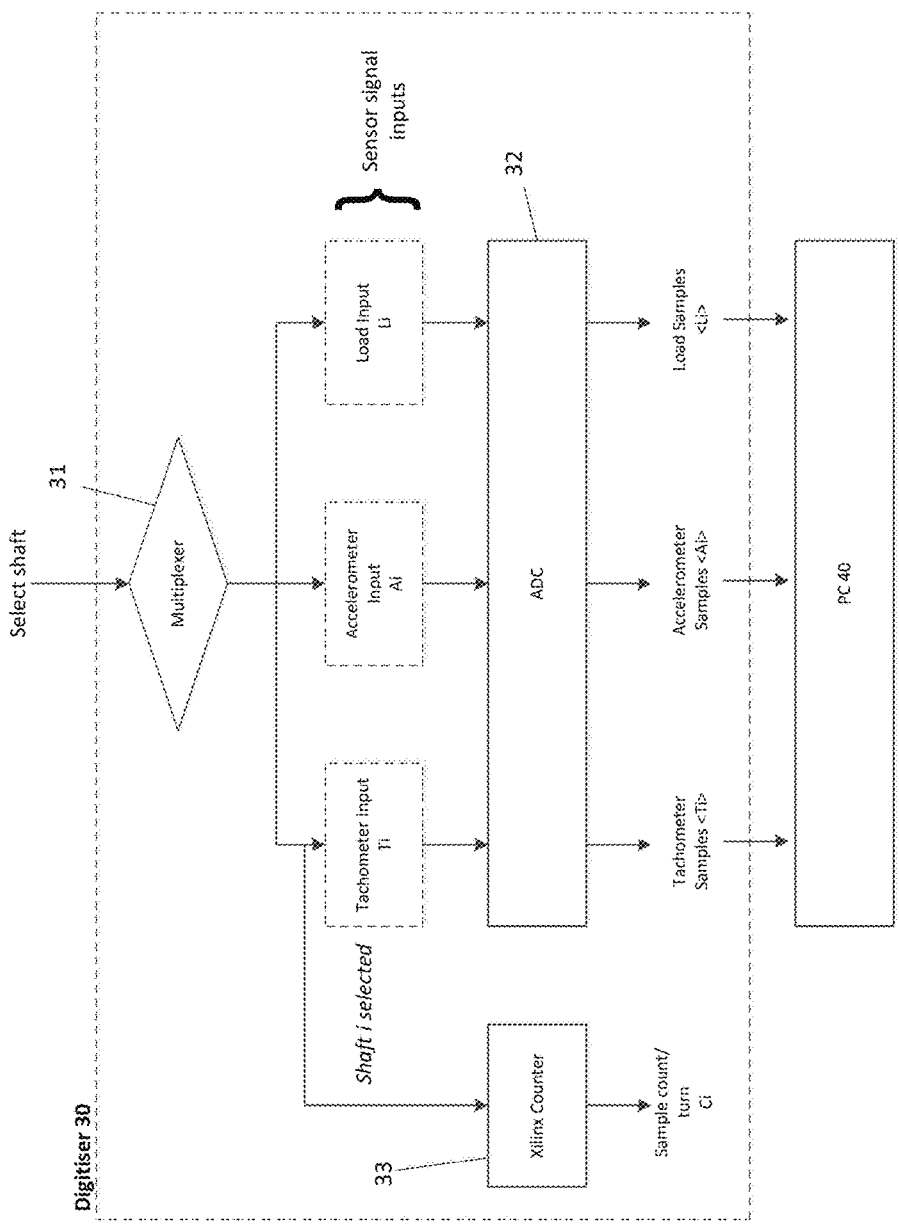
FIG. 2 is a schematic diagram of the digitiser unit of one embodiment of the vibration measurement and analysis system.

With reference to FIG. 2, there is shown a table 22 for use in performing the described analysis method on the mechanical system 10 illustrated in FIG. 1. The table 22 is created using known properties of the components of the machine, in particular the known gear ratios of shafts within the system and the relationship between the shafts, so that the table 22 represents the physical configuration of the mechanical system 10 for the purpose of performing vibration analysis. In the described embodiment, the table 22 comprises a number of columns, each representing a shaft within a mechanical system, and providing information about the shaft properties.

Shaft property values are recorded in one or more fields within the database table, where the fields used include:
i) 'Shaft #' 220, a number which uniquely distinguishes physical and virtual shaft pairs, with virtual shafts taking negative values;
ii) 'Component ID' 221, the order of the shaft from the input drive;
iii) 'Type' 222, describing the function of the shaft in the system. Types of shaft include 'Motor' indicating the input shaft, 'Epicyclic Gear' indicating the physical shaft whose position changes relative to a reference shaft, 'TSA Epicyclic' indicating the virtual representation of the epicyclic physical shaft. The recorded shaft number equal is the negation of the corresponding physical shaft's number;
iv) 'Position' 223, describing the relative position and function of the shaft within the system;
v) 'Connect' 224, describing the connection between engaging components;
vi) 'Driver Gear Teeth' 225 and 'Driven Gear Teeth' 226, together describe the number of teeth of the driving gear and the driven gear:
vii) 'Gear Numerator' 227 and 'Gear Denominator' 228, together describing the gear ratio of the entry, each in integer form for expression as a whole fraction; and
viii) 'Bearings' 229, describing the type (model and manufacturer) of the bearing used in the shaft's gears.

The reference shaft within a system 10 is defined as the shaft from which a tachometer can measure a rotation cycle, which is preferably done by detecting a keyway. The database table records the reference shaft with an ID of '1' in the described embodiment. Gear ratios of all other shafts for the system are recorded based on known characteristics.

The system 10 includes epicyclic gearbox shafts which move relative to each other. To allow analysis of the epicyclic gears, a "virtual" shaft, which is a virtual representation of the epicyclic physical shaft, is included in table 22. In the system 10, which has an input sun gear, a stationary ring gear and a carrier output, the virtual shaft speeds can be determined using the formula: Nr/(Nr+Ns). Derivation of this formula can be explained as follows. After one full revolution of the sun gear with respect to the gearbox, the carrier has rotated Ns/(Nr+Ns) turns, where Ns=the number of teeth on the sun gear and Nr the number of teeth on the ring gear. If the sun gear moves forward by Ns/(Nr+Ns) turns, the carrier will have advanced a further but (Ns/(Ns+Nr))*(Ns/(Ns+Nr)) turns or (Ns/(Ns+Nr))^2 turns, and so it goes on, each time multiplied by Ns. The result is a geometric series of the form Sum from n=0 to infinity of x^n, which is a Taylor series and the solution is of the form 1/(1−x). Via further manipulation, the virtual sun gear ratio can be expressed as Nr/(Nr+Ns).

Use of specification table 22 and the above described method to record data pertaining to the physical properties and/or configuration of a mechanical system preserves the accuracy of the data for the later use in a resampling process so as to allow a user to specify fft lines and shaft orders, and also allow for speed variations, and to later identify the harmonic series of each real and virtual shaft, and bearing. The rolling element bearing numbers for each shaft allow later fault frequency calculations in terms of shaft orders including relative speed of inner and outer rings. Without this table completed, proceeding with automation of accurate trend parameters for specific faults is very difficult and generally not possible.

Use of the specification table 22 allows determination of the required sampling rate of measured vibrations so that shaft of interest can be analysed at consistent and repeated angular positions. Samples are then taken using a sample rate determined using the shaft of interest which can be a real or virtual shaft.

The specification table 22 and the information contained therein reside in database 50, though they may also reside in the PC 40. The database 50 communicates with a digitiser so that a required number of samples are taken from each digital signal processor (DSP). Resampling in the described manner allows 25.6 measurements per gear tooth which can be repeated for each rotation. It is important to have such a high number of measurements per tooth to pick up defects or damage to the tooth.

The database 50 information may be accessed by PC 40 located externally to the mechanical system 10. Embodiments of the described method may include a database management system (DBMS) to facilitate the recording of and access to a plurality of database tables each representing a mechanical system for which vibration analysis is to be undertaken. The machine vibration analysis software program runs on the PC 40, and accesses the stored table data within database 50 for a mechanical system 10 in order to perform analysis and reporting functions. Software used to implement the described method may include separate modules such as display and analysis to perform the user interface (UI) and vibration analysis calculation functions respectively.

The DBMS may include a sub-database for the storage of system configuration data. The described embodiment provides an interface by which the user may enter and modify the configuration details of a mechanical system. In the software program of the described embodiment, configuration database information is entered by interaction with the UI.

Determination of Sampling Rate for Periodically Loaded Machines

Figure 4:
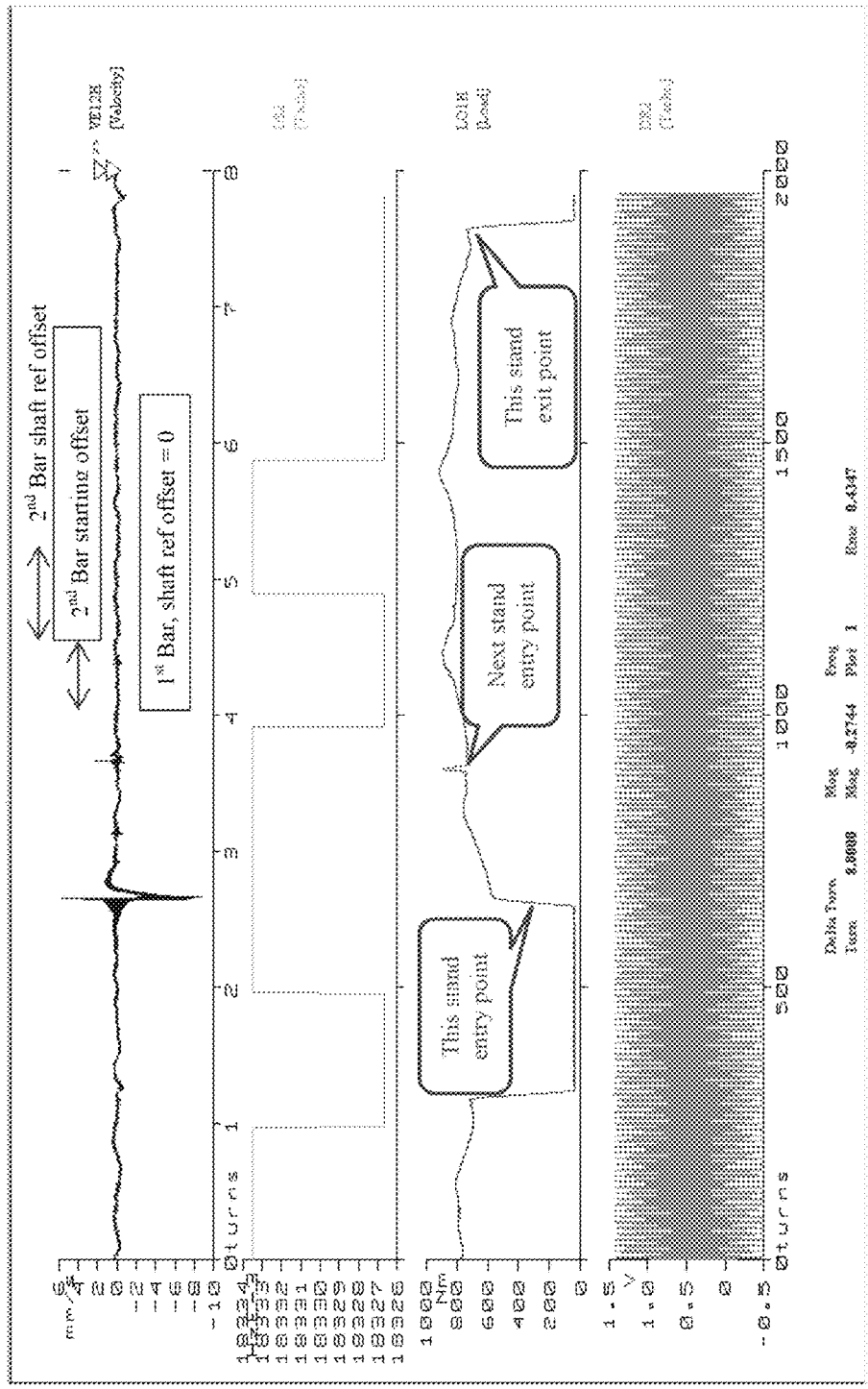
FIG. 4 illustrates the relationship between shaft speed, load speed and vibration for a steel rolling mill.

For machines which are loaded periodically, such as a multi stand steel rolling mill, a sampling rate for data collection is determined by a measurement specification, the measurement specification residing in the digitiser. An example of vibration data recorded from such a machine is shown in FIG. 4 in shaft orders, with gear ratios allowed for. A lower portion of the diagram corresponds to a tachometer waveform, showing approximately 1900 turns of the reference shaft. Above the tachometer waveform is illustrated the load on the reference shaft and reflects the motors torque, for example in NM. From the load chart, a user can see the exit of an existing bar in the stand, a no-load condition following this exit, an increase in load corresponding to a further bar entering the mill for processing, which triggers a 400 NM load level, a small spike corresponding to a bar entering a subsequent stand, and a falling load due to the bar exiting the present stand. Immediately above the load chart is an illustration of motor speed. Above the motor speed illustration is a vibration waveform corresponding to 8 turns of the shaft of interest, showing large oscillations any time there is a sharp torque increase. It is these oscillations that are to be avoided in the measuring process, which has to end before the bar leaves the stand.

For a mill processing a bar of known length range and a known rolling wheel diameter range, it is possible to determine using the gear ratios how many turns each shaft will make during the passage of 1 bar of steel through a stand of the rolling mill. This allows the digitiser to determine logical limits for FFT lines and shaft orders during analysis.

Practical testing of the machine can determine how many turns of the motor shaft occur between a bar entering a first stand and it's impact entering the next stand, which will cause a spike in measured vibrations. In conjunction with other data input, a delay of a predetermined number of motor turns can be added, independent of motor speed, before vibration data is collected. Triggers for speed and load criteria can also be incorporated into a determination of whether to commence data collection.

It is now possible to calculate the number of measurable turns of any shaft in the gearbox and define the required number of FFT lines, number of shaft orders, and a nominal frequency range at which to sample. If the load or speed triggers are not met the machine performance can be analysed to see what happened as part of development and set up.

Using the known relationship of shaft turns equals FFT lines/shaft orders, and the knowledge that the minimum number of shaft turns to obtain useful data is at least 1 and possibly 2, it can be determined that for a shaft speed of 10 Hz for example, to obtain a desired 100 shaft orders a frequency range of 1000 Hz is required. Thus, the minimum sampling frequency=1000×2.56=2560 samples per second. The nearest higher binary range is 3200 samples per second, which also allows for some oversampling. This range is selected and the data sampled at this rate once the trigger conditions are met.

Data Collection for a Periodically Loaded Machine

It is not practical to constantly measure and record data for a periodically machine. During the data collection process, a plurality of analogue-to-digital converters (ADC's) simultaneously sample at 64K s/sec then decimate or decimate/demodulate in real time. In a preferred embodiment, a Xilinx chip is used to count the period between each tacho leading edge at a rate of 64 K s/sec, for later use in establishing a speed map, as illustrated in FIG. 4.

The digitiser 30 checks for a motor speed above a predetermined level, determines a rotation direction and decides on the fixed frequency range, as described above, to allow some oversampling. The digitiser also checks for motor load transition from low to a predetermined threshold.

The process of recording data is as follows:
wait a predetermined number of motor turns to allow for the bar to enter the next rolling stand to avoid impact and backlash;
acquire samples for later resampling a predetermined number of turns of the shaft of interest, based on the communicated measurement specification (required FFT lines and orders) and the gear ratio to the shaft of interest;
acquire a minimum 256 samples on either end for digital filtering buffers (which will be described further below); and
check the load is still above a transition level at end of sampling to avoid no-load samples.

The digitiser may track the number of rotations of the reference shaft which, based on the known gear ratios, allows the shaft of interest to complete the required number of turns before sampling ceases.

The measurement specification is communicated to the digitiser 30 from the PC 40 and includes the desired number of FFT lines and shaft orders required from the resultant data and the gear ratio that describes the relationship between the shaft of interest and the input shaft with the tacho. It also includes a default frequency range to sample at if the capture parameters are not met. There are also requirements passed to the digitiser 30 that define the conditions that must be met before sampling the accelerometer waveform. These may include a sensor settling time, a minimum input shaft speed, input shaft direction and motor load. Some measurements require a second waiting period, which be shaft turns or a time delay, after the motor load has exceeded the acceptable lower limit to account for a bar hitting the next stand and causing an unwanted glitch, as described above.

Once the start conditions are met, the digitiser 30 tests the speed of the input shaft and using the gear ratio and required orders specified will determine a sample rate slightly higher than the minimum required, to allow for some oversampling in case the motor speeds up during measurement.

The digitiser 30 begins to collect data while the decimation filters fill. Once the decimation filters are full the digitiser begins to store the incoming data in a large buffer. The digitiser requires at least 256 samples and a speed map entry to be stored before the next speed map entry is used as the point of reference for the "body" of the data capture. Up until that point extra samples or speed map entries are discarded.

The digitiser 30 continues to sample at fixed frequency, whatever the speed variation is, until the desired number of turns of the shaft of interest have been captured and then captures a further 256 samples. Once collected, the data is transferred to the PC 40 for analysis.

Quality Control and Sensor Fault Tolerance

In the described method, the digitiser performs an analysis of the accelerometers that checks their state against predetermined quality control conditions, specifically, the accelerometers are checked for very slow (low frequency) bias voltage drift. Failure of this check causes a repeat measurement.

This step is necessary as mass produced sensors are not all equal, and have varying amounts of bias voltage wander. The drift signals are typically not cyclic in nature and are somewhat random. Once in the frequency domain, these signals are represented by spectral lines that are inseparable from the signal of interest. Particularly for signals that are later integrated, the slow wandering bias voltage produces very high 1/f noise levels, and affects the spectrum from DC through many shaft orders. This noise cannot be removed later in the frequency domain.

The following steps are taken to remove this drift:
the average signal level is determined;
the signal is integrated in the time domain using a completely reversible procedure;
an IIR high pass filter (2 pole Butterworth) is applied to remove the low frequency drift, with the corner frequency specified in the measurement specification;
the filter impulse response is removed by recognising that the filter has a predictable impulse response shape, that can be defined and modelled mathematically, then removed by subtraction;
the signal is differentiated in the time domain using the inverse procedure to the integration above; and
the average signal level is added back to the result.

The filter output can be made to settle sooner by modifying the filter coefficients during operation, from a higher corner frequency to a lower corner frequency. The formula used may be to smoothly migrate from the initial to final cut off frequency with a function of the type: $Y_n = 0.99 \cdot Y_{n-1} + 0.01 \cdot X_n$, with $Y_{n-1}$ set to the initial cut of frequency, and $X_n$ set to the final cut off frequency.

Regardless of how quickly the filter transient response is made to settle, there will be a transient and settling period as the first non-zero samples are fed into the filter, and the filter's impulse transient shape can be modelled by a damped exponential sinusoidal function having the formula: $Y = b \cdot e^{(-at)} \cdot \sin(w \cdot t)$.

To highlight the residual transient, the high pass filtered acceleration signal is integrated in the time domain using a simple and reversible formula:

$$y(0 \ldots N-1) = \{y[n] = x[n] \text{ when } n = 0$$
$$\{y[n] = y[n-1] + x[n] \text{ for } n = 1 \ldots N-1$$

Where, N=number of samples, n=sample number, and $x(0 \ldots N-1)$ is the input data set.

The initial transient response model is then fitted to the data using an iterative solution to minimise the square root of the squared error value. The modelled transient response can then be subtracted from the data.

Finally the data is then differentiated inverting the formula used to integrate it previously;

$$x(0 \ldots N-1) = \{x[n] = y[n] \text{ when } n = 0$$
$$\{x[n] = y[n] - y[n-1] \text{ for } n = 1 \ldots N-1$$

High pass filters with very low corner frequencies of either analogue or digital infinite impulse response (IIR) design, can require thousands of samples to settle prior to measurement, often as long as the useful part of the measurement. By reducing the settling time and removing the initial transient response the filter initial response can be effectively removed from a finite length data set.

In practice, the digitiser 30 checks the state of the accelerometers against quality control conditions with failure causing a repeat measurement. This process is performed as follows:
check dc bias of specified signals and reject as needed (this is determined from the average value of the signal, and compared with specified limits);
check general waveform slope;
for final acceleration data, check median filter centre line for divergence from a straight line. The median filter is implemented by defining a window (say 64 samples), and determining the median value of the waveform with the window centred at each sample point in turn;
integrate to velocity depending on the measurement specification;
check velocity spectrum for low frequency noise in a predetermined range, i.e. up to 3 Hz; and
calculate the rms level in this range and compare to limits in the measurement specification (failure may require a repeat measurement).

Resampling for Shaft Orders Analysis.

The described method includes a step of resampling the obtained speed data to improve further analysis processes, in particular a later shaft order analysis. Such a step is required as the speed of a motor can vary over a data collection period. The step includes the creation of a map (refer FIG.

5) of shaft turns of the tacho shaft against time (i.e. number of counts @ 64 KHz), for each turn, to the total number of turns required. A Hermite cubic spline fit is then applied to each turn to determine the continuum of shaft angle for the whole data block.

The measured tachometer shaft period data points are assumed to be accurate. The Hermite spline can be thought of as fitting curves to successive groups of 3 points with the critical joining condition of the curves being that they must have a common tangent, and there are limits and a form of damping applied to optimize the curve fit, which can then provide intermediate shaft speed information during each turn, not just a straight line between points. This data can then be used to determine instants of equal angle around the shaft for each turn to the total number of turns required.

Such a step is necessary to ensure accuracy of the collected data. For example, a 400 tooth ring gear on a Sag mill will require very high accuracy out to the 10th harmonic of the tooth meshing frequency, i.e. 4000 orders to have 25.6 samples per tooth in exactly repeatable positions up each tooth face. Without such accuracy, gear teeth faults are difficult to identify.

Previous systems have attempted real time resampling but have difficulty predicting the future from recent past samples in real time, and loose accuracy due to lag and then overshoot when the speed changes. These systems struggle for accuracy beyond 100 orders.

This step can allow interpolation of amplitude values at positions around the shaft using a band limited Sync function, plus an additional feature of changing the band width in proportion to the shaft speed to avoid aliasing.

Figure 6:
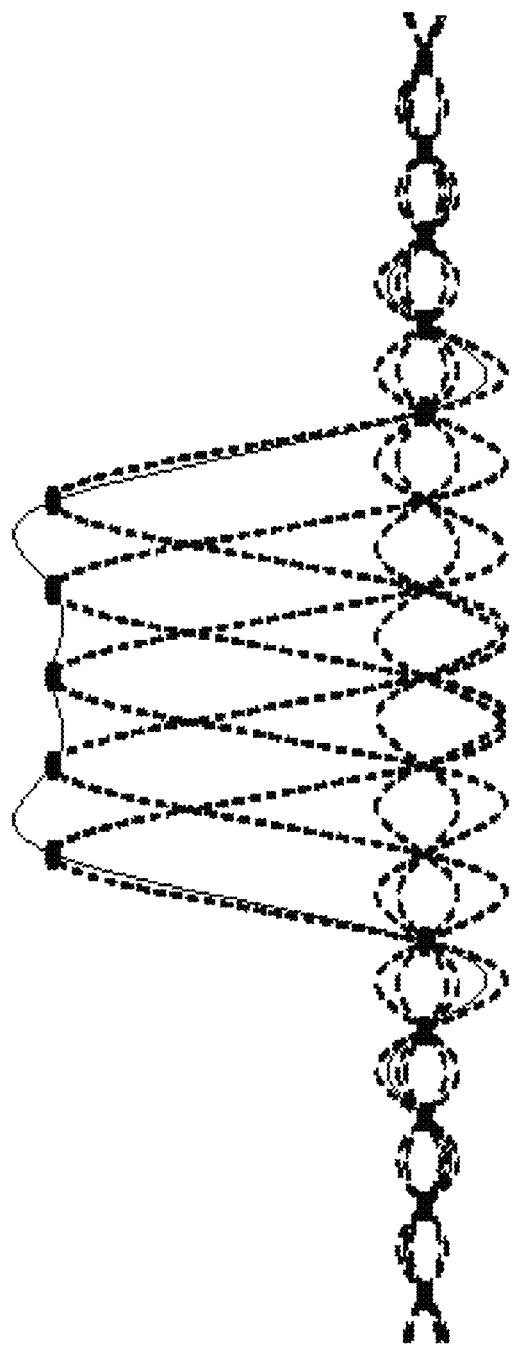
FIG. 6 is a band limited construction of the resampled vibration VE12H signal of FIG. 4.

FIG. 6 illustrates a bandlimited reconstruction of the signal, with the dots showing the signal samples, the dashed lines showing the component sine functions, and the solid line shows the unique bandlimited reconstruction from the samples obtained by summing the component sine functions.

FFT and Integration

Once the data collection step has been completed, time and frequency or turns and orders domains can be swapped reversibly any number of times using FFT and inverse FFT routines.

Certain modifications of individual spectral lines can also be performed without effecting the reversibility. Windowing of the waveform can be used to force the waveform smoothly to zero at it's ends, which is in practice irreversible.

Digital integration, free of analog limitations, can be done reversibly in the frequency or orders domain by applying the following formula to every spectral line except zero and subtracting 90 deg at each line:

Velocity (mm/s)=acceleration ((g's×1000×9.81)/(2× Pi×Hz))

Displacement (mm)=velocity ((mm/s)/(2×Pi×Hz))

The velocity waveform is also useful and an inverse FFT of the integrated spectrum will produce the velocity waveform correctly. This waveform will be free from high pass filter analogue distortions of amplitude and phase.

Turns Synchronized Averaging

The inventors have found that to accurately analyse the vibrations of a machine and identify the cause and location of a fault, it is important that vibration measurements are sampled at consistent rotational locations for each of the shafts of interest to be considered. However, it is not practical or cost effective to fit a tachometer and accelerometer to each shaft of interest to measure vibrations caused. By using a tachometer pulse to indicate the commencement of each rotation cycle of the reference shaft as vibrational samples are recorded, and by knowing the relationship between the reference shaft and the shaft of interest, it is possible to correlate rotation of the reference shaft with the vibration data corresponding to a rotational position or location of the shaft of interest. This establishes a relationship between a reference point or virtual keyway on the reference shaft and rotational positions of a shaft of interest.

Once the required rotational positions of the measured shaft have been identified using the relationships known from the table and the speed map, which can provide more accurate information on the speed and rotational displacement of the drive shaft, it is possible to interpolate the measured vibrational data, as will be discussed further below, consistently at reoccurring locations on the shaft on interest so that a consistent sample of vibrations can be recorded, thereby allowing comparisons to be made and irregularities that can potentially correspond to faults identified. In effect, this analysis realigns the data so that an approximation of the vibrations at the rotational position of interest can be obtained.

To find a repeating pattern in the presence of noise, such as a fault on a single gear tooth in a complex machine, an averaging process of data collection is used in the turns domain, based on a trigger signal at a constant angular position on the shaft of interest, i.e. the virtual keyway, is referred to as Turns Synchronised Averaging.

The waveform beginning at the virtual keyway, which may include 1024 data points for example, can be assembled for each turn of the shaft, for example 32 turns. The data is assembled like steps on a ladder and starting from the first data point on the top step, the value on each lower step, which can be +ve or −ve, is algebraically added and averaged, from first to last data point. Data points which are not very repeatable converge to a near zero value and those that were repeatable generally converge to a larger value.

The result is the repeatable part of the waveform, starting at a known reference position on the shaft relative to the tacho pulse. This shows repetitive waves and single events, which are important for identifying gear profile wear, single tooth gear faults, and events such as change of direction impacts in reciprocating machines.

The offending physical damage can be found by measuring around the shaft from the reference position, in proportion to the position of the damage from the start of the waveform. To achieve this ideal outcome also requires individual alignment compensation for all processed signals.

The fundamental problem with time domain averaging/time synchronised averaging is that small variations in shaft speed mean a real single event does not necessarily occur on the same waveform sample numbers. The resulting waveform tapers towards the end of the samples, often to near zero, and with smearing of the pattern.

Resampling of the motor speed/displacement data, using a spline fit of the tacho angular data on the shaft of interest to the orders domain, as described under the heading "Resampling for Shaft Orders Analysis" can solve this problem. In the orders domain there are a fixed number of samples per turn of the shaft of interest, and the spacing between each sample is a fixed angular value. For example, with 1024 samples per turn, each sample is at 360/1024=0.3515625 degrees. The process of averaging signals from the orders domain is hereinafter referred to as Turns Synchronized Averaging (TSA).

During data capture, the PC 40 keeps count of the number of turns so far acquired that have passed the quality control limits and decides if another data set is required.

At this point the data set will consist of a binary multiple of turns, the least being 1 turn, but preferably 2 turns. The individual turns can be averaged in the turns domain and a data set produced of the same length as the original, but of the same number of identical turns joined. The join variation is not statistically different to the variation between any other two points on the waveform.

To make an average of 32 turns, it would be possible to collect 32 data sets of 1 turn each, or 16 data sets of 2 turns each, or 8 data sets of 4 turns each, etc. The above turns averaging process would be repeated i.e. 16 times for data sets of 2 turns each.

The data can also be aligned between data sets. For example, discontinuously loaded shafts such as in a steel rolling mill may require several bars to pass through the stand with unloaded time between them, to accumulate the number of turns specified to perform an analysis.

This requires turns counting over the whole period required to pass many bars using a 32 bit counter. To avoid a vast memory to store loaded and unloaded waveform data, the data collection ADC's stop at the end of the required number of samples and wait for the next bar to enter the stand to begin the process again.

Figure 7A:
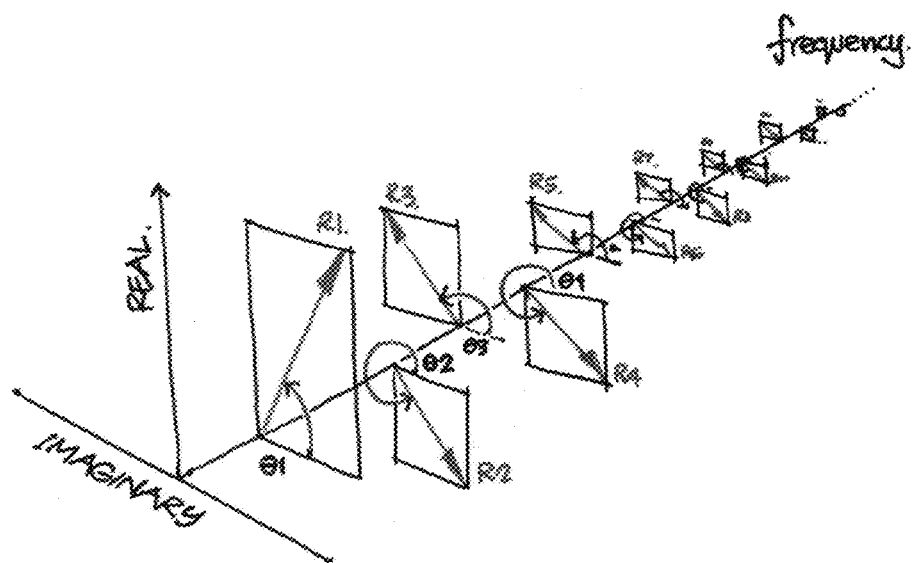
FIG. 7A is an orders spectrum showing real and imaginary components in a phase diagram, illustrating a method of obtaining vibration data for a periodically loaded machine.
Figure 7B:
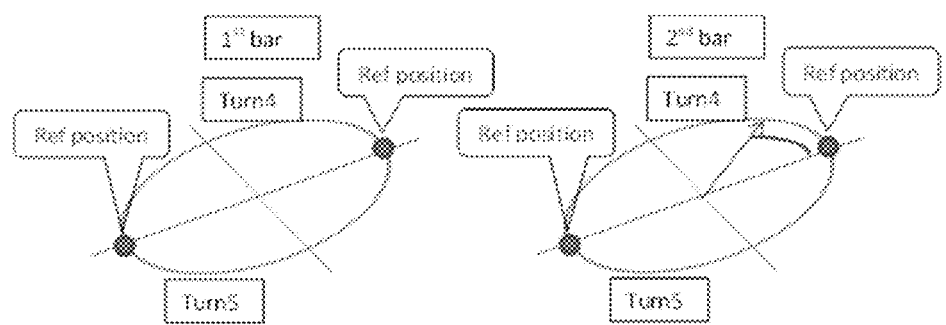
FIG. 7B is a bode plot illustrating the principles of FIG. 7A.

With reference to FIG. 7*b*, 2 turns can be captured after the "next stand entry point" allowing for the reference position to fall within turns 4 and 5. In some rolling mills the unloaded condition may occur sooner and barely 2 fully loaded turns exist.

Referring again to FIG. 7*b*, the load graph shows the bar hitting the next rolling stand and the vibration effects. The triggering and waiting conditions must again be met to begin ADC sampling, and this instant is unlikely to align with the reference position on the shaft of interest, for the first bar, so another alignment process is performed using a conceptual circular buffer, as illustrated with an offset error of 30 degrees.

It is not likely that there is an existing sample that just happens to occur at the precise same position in the current data set as the first sample in the first data set. Consequently, the method used takes advantage of the fact that an FFT contains both magnitude and phase of spectral components, and simply rotates each spectral line by whatever fractional number of radians is required to precisely align the current data set with the first data set. An inverse FFT then yields the time domain aligned data.

After performing FFT on each set of data for conversion into the orders domain the data is realigned such that the first sample occurs at the same shaft location as the first sample in the first data set. This is achieved by recording the number of revolutions of the input shaft by the digitiser 30, and calculating the angular offset between the start of the current data and the first data.

With reference to FIG. 7*a*, each phasor in the orders domain is then rotated so that the waveforms align. If the offset was 30 degrees, for example, the 1× order line is rotated 30 degrees, while the 2× line is rotated 60 degrees and the 3× line by 90 degrees, etc.

When enough data sets have been captured to acquire the desired number of turns to average, the data sets are averaged in the orders domain in Real & Imaginary format, and returned to the turns domain, where two turns of data are presented for further processing and visual identification of repetition patterns using condition indicators, as will be described further below.

For a mechanical system, such as a gearbox having two or more shafts or an epicyclic gearbox (which also has virtual shafts), having only a single tacho fitted to one shaft, performing TSA on any continuously turning shaft or continuously loaded shaft is still possible using the mechanical table 22 illustrated in FIG. 3.

When the shaft of interest is not the tacho shaft, the gear ratio between the reference shaft and the shaft of interest is included to keep the timing of the shaft of interest over many bars using the known exact gear ratio between the input tacho shaft and the shaft of interest and keeping track of the number of turns from the input shaft in order to know where the shaft of interest is with respect to the virtual keyway.

When the shaft of interest is the sun gear shaft on an epicyclic gear box, a virtual shaft speed must be used to capture one complete turn of the sun gear with respect to the planet gears where the ring gear is fixed. This virtual shaft speed, or gear ratio, has been determined as below.

In this example, which applies to the illustrated system 10, after one full revolution of the sun gear with respect to the gearbox, the carrier has rotated $Ns/(Nr+Ns)$ turns, where $Ns$=the number of teeth on the sun gear and $Nr$ the number of teeth on the ring gear. If the sun gear moves forward by $Ns/(Nr+Ns)$ turns, the carrier will have advanced a further $(Ns/(Nr+Ns))^2$ turns, And so it goes on, after each turn the carrier has advanced a little further. The result is a geometric series of the form Sum from $n=0$ to infinity of $x^n$, which is a Taylor series and the solution is of the form $1/(1-x)$, from which we can derive the virtual sun gear ratio of $Nr/(Nr+Ns)$.

Averaging Gear Tooth Profile & Individual Tooth Faults for Each Gear in a Gearbox To obtain useful data, vibration data is averaged for each gear in a gearbox. For a gearbox input and output shaft there is normally only one pinion or gear respectively, so the TSA process described above only contains the vibration pattern from the one gear with a known number of teeth.

For each intermediate shaft there is a driven gear and a driving gear with different numbers of teeth, which may be 195 and 21 teeth, for example. In such an example, both tooth vibration patterns will exist in the TSA data because they are both synchronous with the shaft. Also, where 2 shafts are joined axially by a spline coupling and each shaft has a gear, both tooth vibration patterns will also exist.

In one example, the mechanical system 10 of FIG. 1 includes an epicyclic gearbox 14 with a fixed ring S4 and output carrier S5 connected to the input of a parallel shaft gearbox S6 where both tooth meshing frequencies, 195× and 21×, are exact multiples of the common shaft speed.

To accurately analyse the vibration of either gear, it is necessary to remove from the waveform the tooth meshing vibration from the other gear. To remove the tooth meshing vibration of the other gear from the TSA waveform, for instance the 195 tooth gear, a software function is provided to minimize all harmonics of 195× and their +/−1 order sidebands, using a FM4 procedure, to the back ground level. The side bands are removed to minimize any eccentricity effects of the other gear meshing vibration. Sideband removal is preferred but not essential.

Occasionally, by unintended design, certain orders of one shaft are an exact multiple of certain orders of another shaft. A software function to exclude single orders or order bands may also be used.

Both tooth vibration patterns will not exist in an epicyclic gearbox with a fixed ring and output shaft with the carrier connected to the input of a following epicyclic gearbox with a sun input, fixed ring and output the carrier. This is because the tooth meshing frequency of the sun gear of the following gearbox is at a virtual shaft speed, and will average away from the carrier meshing, and visa versa.

A fixed frequency such as six times line frequency=300 Hz and harmonics, from an SCR controlled DC motor exists, and depending on exact shaft speed, can "wander" across the orders spectrum causing errors in one or more orders FFT lines. A software function is used to exclude order bands that could be affected.

Retrieving the Force Waveform from the Vibration Response Waveform.

The effect of gearbox resonances in the measured data can be minimized using data with a cepstrum filter applied to it because the resulting shape is similar to the modal parameters shape forced by a shaker or impact. This is based on the relationship, vibration response in mm/s equals input forces in N×modal parameters in N/(mm/s) across the spectrum.

In practice, forces in a machine sum by super position theory. By way of example, FIG. 8A illustrates a gear mesh forcing function in the form of a triangular wave, the gear being a 20 tooth gear. FIG. 8B illustrates a power spectrum of this waveform.

FIG. 8C illustrates a once per revolution rectangular impulse. The power spectrum of this impulse is illustrated in FIG. 8D.

FIGS. 8E and 8F respectively show the summation of the waveforms of FIGS. 8A and 8C and the summation of spectra 8B and 8D.

FIGS. 8G to 8I illustrate the forcing functions multiplied by the machine modal parameters to produce a vibration (system) response (8G), a system frequency response (8H) and a power spectrum of the system response (8I).

FIGS. 9A and 9B illustrate, respectively, one turn of synthesized bandlimited data and a FFT of the synthesized bandlimited data. Tooth meshing frequency lines can be seen at 20 and 40 hz FIG. 9D illustrate the spectrum with tooth meshing harmonics (refer FIG. 9B 20 Hz & 40 Hz) removed. The waveform of FIG. 9C is obtained followed by an inverse FFT routine. It will be appreciated that forces and modal parameters multiplied together can be divided using Cepstrum subtraction.

FIG. 9F illustrates a Cepstrum short pass lifter of the spectrum to subtract the system response. As illustrated in FIG. 9E, an inverse FFT routine can then be performed to obtain a waveform of the original once per revolution rectangular impulse.

Condition Indicators

Using the above described methods, a TSA waveform can be obtained for each gear in the gearbox and trend parameters can be calculated and trended, for example, rms, peak to peak etc. These parameters are unlikely to detect a single tooth fault in the presence of a higher level of tooth profile waveform, but they are a good measure of the general profile condition.

The tooth meshing frequency harmonics, as a group, hold average profile wear information so removal of all other orders from the spectrum and performing an inverse FFT procedure back to the turns domain produces the average profile waveform of the gear. This allows rms, peak to peak values etc to be calculated and trended for each gear.

All orders, other than the tooth meshing frequency harmonics, hold the instantaneous variations about the average profile wear as a shaft turn progresses, for the shaft and each individual tooth. So removal of all the harmonics and performing an inverse FFT back to the turns domain produces the errors of gear eccentricity and in shape of each individual tooth from normal, which should be a straight line. Removal of the shaft eccentricity and large profile error signal allows these smaller signals to be clearly detected.

Normal vibration analysis in the orders domain mixes these characteristics of each gear and also mixes the vibration of the pair of gears so trending these turns based values is a big improvement over previous condition monitoring processes.

Table 1 below illustrates a set of functions commonly used as condition indicators.

TABLE 1

| CI | Filter | Formula | Numerator | Denominator | Nominal Value | Threshold Value |
|---|---|---|---|---|---|---|
| FM4 | Remove gear mesh & harmonics, 1st order side bands, shaft 1/rev, 2/rev | $\dfrac{\dfrac{1}{N}\sum_{n=1}^{N}(d_n - \bar{d})^4}{\left[\dfrac{1}{N}\sum_{n=1}^{N}(d_n - \bar{d})^2\right]^2}$ | $4^{th}$ moment about mean of difference signal | square of variance of difference signal | 3 | 5-7 |
| NA4 | Remove gear mesh and harmonics, shaf 1/rev, 2/ref | $\dfrac{\dfrac{1}{N}\sum_{n=1}^{N}(r_n - \bar{r})^4}{\left[\dfrac{1}{M}\sum_{m=1}^{M}\dfrac{1}{N}\sum_{n=1}^{N}(r_{n,m} - \bar{r_\omega})^2\right]^2}$ | $4^{th}$ moment about mean of residual signal | Square of average variance of all residual signals up to current time (running average) | | 5 |
| NA4* | Same as NA4 | Same as NA4 | Same as NA4 | Each new den. is tested via a hypothesis test. If it falls within the limit of a healthy dataset it is included in the den. | | 5 |
| NA4 Reset | Same as NA4 | Same as NA4 | Same as NA4 | Reset when load varies x% | | 5 |
| FM4* | Same as FM4 | Same as FM4 except running average in denominator | Same as FM4 | Each new den. is tested via a hypothesis test. If it falls within the limited of a healthy dataset it is included in the den. | | 5 |

Common to the above functions is the concept of using Kurtosis to detect the difference between a regular pattern (similar wear on all teeth) and a regular pattern with a single distinctly different peak (a single tooth fault). The basic Kurtosis calculation is independent of signal size.

Regarding function FM4, one problem is that it increases when the first single tooth fault appears but decreases as more single tooth faults appear. Also, because it's not sensitive to signal size, a small single event in a small general signal can produce an alarm, for no significant damage.

Regarding function NA4, one problem is that additional maths have been added, which makes it very sensitive to signal size, with poor repeatability for a given load. An attempted fix is NA4 Reset, which requires a load measurement which the vibration must vary proportionally with. This is not always the case, causing big variations (high and low) which can cause alarms, for no significant damage.

So neither FM4 or NA4 are reliable for trending single tooth faults, where a higher value equals higher damage. The basic waveforms created, are clear by eye to be very useful, though the functions have a problem.

The NA4 and FM4 filters applied to TSA waveforms are based on the fact that:
- the tooth meshing frequency (shaft speed×number of teeth) harmonics contain the average profile error information for all teeth on the gear,
- the shaft speed harmonics (other than the tooth meshing frequency harmonics) contain all the modulation (variations);
- 1× and 2× shaft speed harmonics are dominantly caused by gear pod eccentricity and misalignment effects, with minimal information about single tooth faults and are removed; and
- FM4 also removes the +/−1 sidebands around each tooth meshing frequency harmonic to further remove eccentricity modulation from the remaining waveform to enhance single tooth fault detection.

The inventors observed a close correlation between the trend of FM4 peak to peak value (FM4P2P) of the waveform and the severity of single tooth events. Where shaft speed modulation is minor the NA4 waveform peak to peak value is very similar, but this condition cannot be guaranteed.

The FM4 modulation waveform for a gear in good condition will always have a small peak to peak value and a single tooth fault appearing above the general pattern trend will cause a P2P alarm. A rise in the general pattern will also cause a P2P alarm, and cannot be recognized as different from a single tooth fault by this trend, but both are significant and worthy of tripping an alarm level.

If FM4 and FM4P2P both rise & exceed alarm, the probability of a first single tooth fault is high, though visual analysis is still required to definitively separate the 2 types of waveform. The important point is a rise in level corresponds to a rise in damage, unlike Kurtosis measurements.

The inventors have also found that FM4 and NA4 waveforms in velocity, acceleration and demodulated acceleration signals respectively emphasize:
- low frequency events, shaft speed harmonics extending to the first few tooth meshing frequency harmonics;
- medium frequency events, shaft speed harmonics above the first few harmonics of tooth meshing frequency; and
- high frequency events, modulated by shaft speed harmonics such as metal to metal impacts of the teeth through the lubrication film.

For low speed equipment fault detection, the velocity parameters perform better than acceleration or demodulated acceleration. However, single and multiple tooth faults are not necessarily clear in all three waveforms and do not necessarily show at the same position on the gear in these waveforms.

This suggests that the velocity impact waveform, typical of a significant fault that can be hand felt and audible, may not causing metal to metal contact at that tooth, but other teeth without significant velocity detectable faults may be suffering metal to metal impacts, as part of their long term wear progress.

This appears similar to bearing surface faults where short sharp impacts piercing the lube film, detectable in demodulated acceleration, occur and can go on for many years without significant pits forming, which are detectable in velocity i.e. hand felt and audible vibration.

FIGS. 10 to 15 illustrate the use of condition indicators in analysing measured vibration data for a system having a gear tooth fault, which in this example can be seen as a notch in the FFT waveform.

Figure 10:
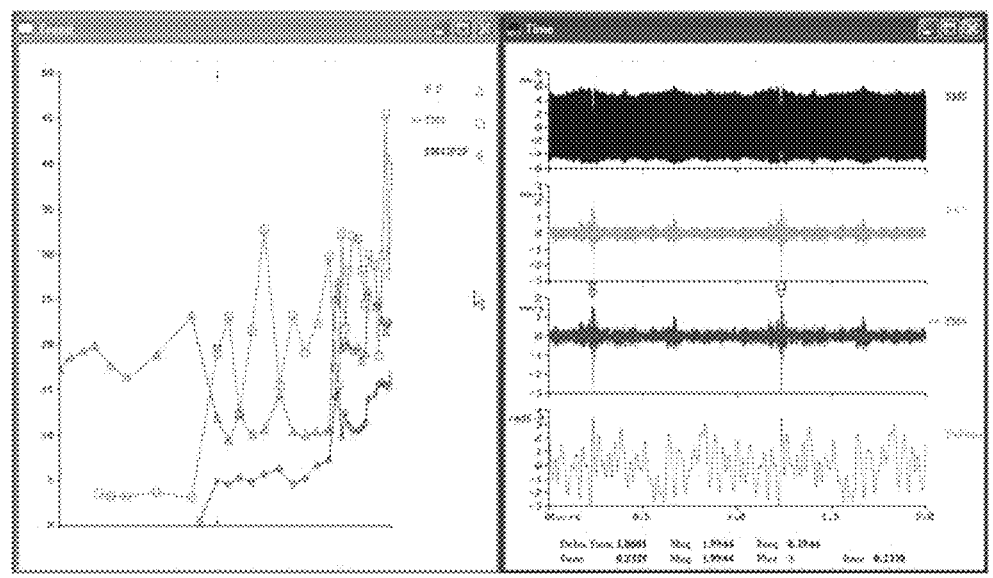
FIG. 10 illustrates a velocity plot of peak to peak, FM4 and FM4 peak to peak values of the waveform.
Figure 11:
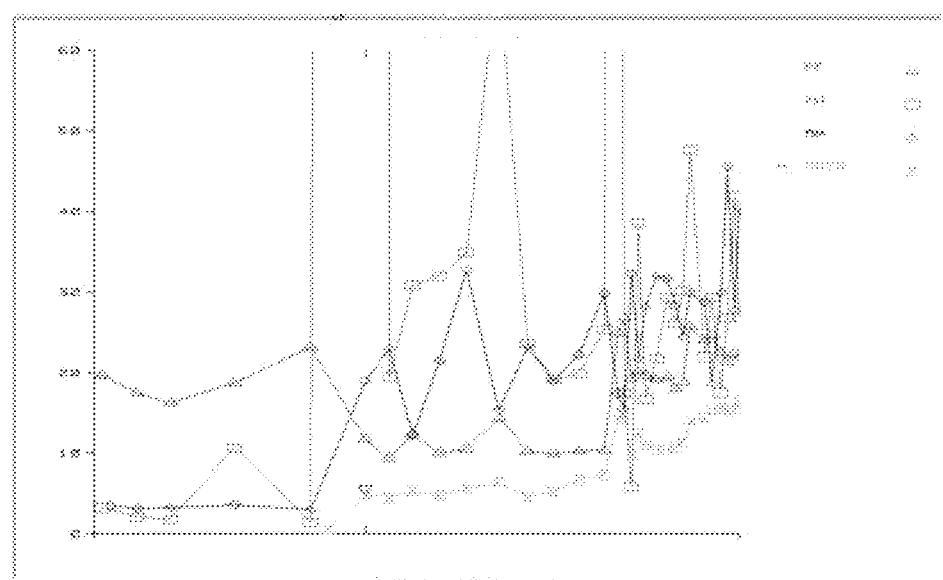
FIG. 11 illustrates another velocity plot showing peak to peak, NA4, FM4 and FMPJ peak to peak values of the waveform.
Figure 12:
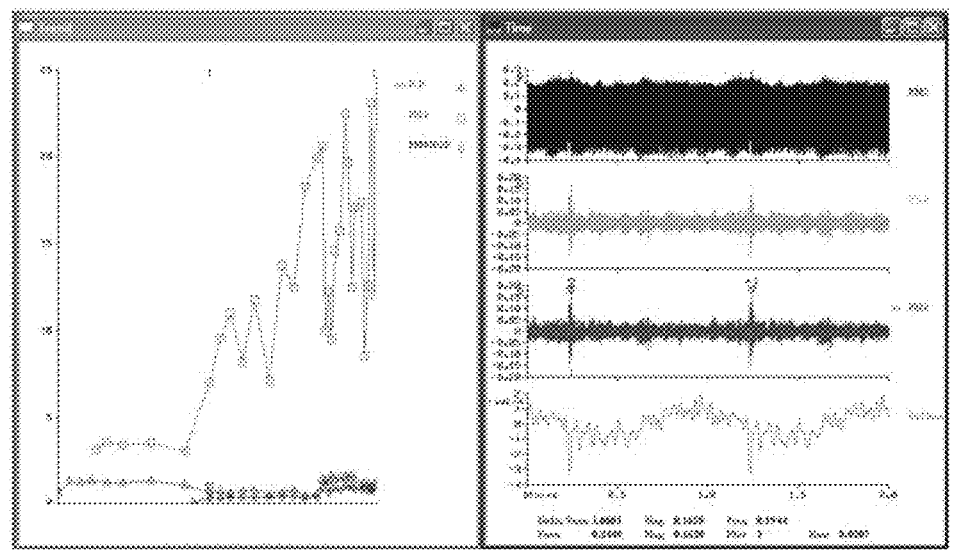
FIG. 12 illustrates an acceleration plot of peak to peak, FM4 and FM4 peak to peak values of the waveform.
Figure 13:
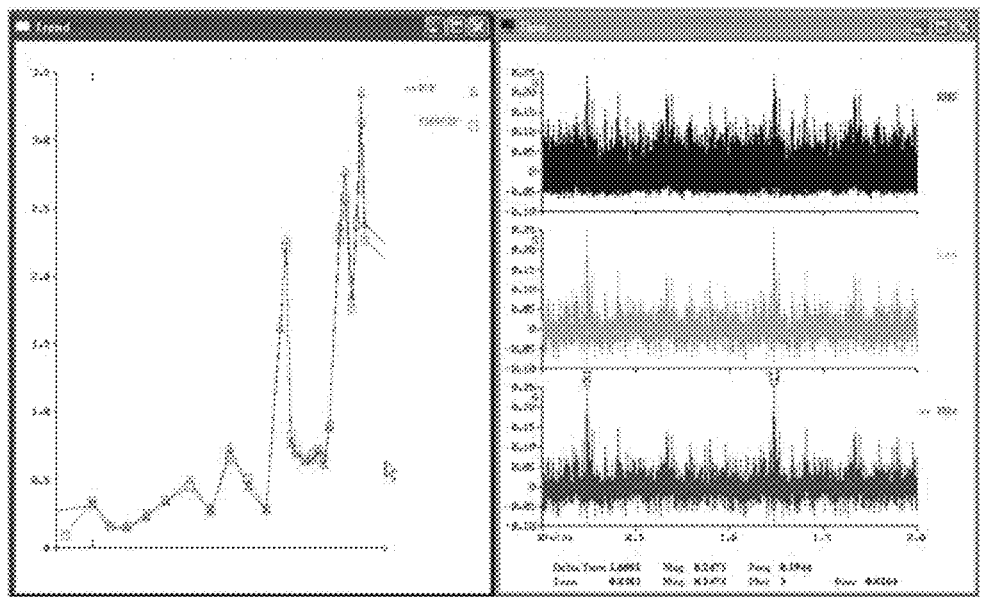
FIG. 13 illustrates a demodulated acceleration plot of peak to peak and FM4 peak to peak values of the waveform.

FIG. 10 illustrates a velocity plot of peak to peak of the TSA waveform, FM4 and FM4 peak to peak values. It can be seen that the FM4 P2P rises consistently with low volatility whereas the FM4 and P2P TSA waveforms are highly volatile and misleading. FIG. 12 illustrates another velocity plot showing peak to peak TSA waveform. NA4, FM4 and FMP peak to peak values. The NA4 line can be seen to go off the scale and fluctuate but, on average, does not increase after the first detection.

FIG. 12 illustrates an acceleration plot of peak to peak, FM4 and FM4J peak to peak values. Again, it can be seen that FM4 P2P rises consistently whereas the P2P value is highly volatile and misleading, though the parameters are less sensitive to the fault.

Figure 14:
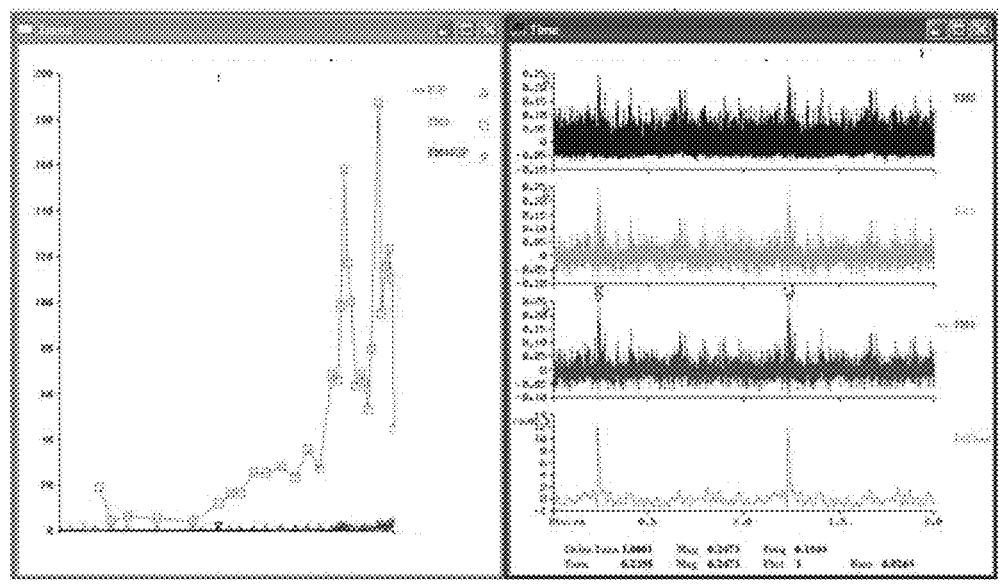
FIG. 14 illustrates a demodulated acceleration plot of peak to peak, FM4 and FM4J peak to peak values of the waveform.

FIG. 14 illustrates a demodulated acceleration plot of peak to peak, FM4 and FM4J peak to peak values. Again, it can be seen that FM4 P2P rises consistently whereas the P2P value is highly volatile and misleading, though the parameters are even less sensitive to the fault.

Figure 15:
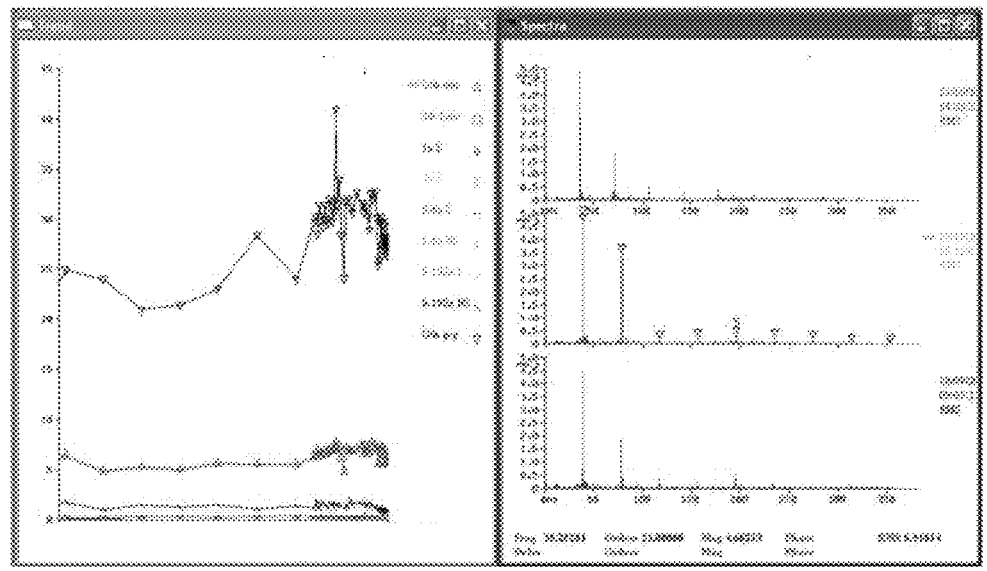
FIG. 15 illustrates spectra before and during a process of increasing damage.

FIG. 15 illustrates spectra before and during the process and from a comparison no visual difference is noted because the short and sharp, once per revolution impulse is spread across the whole spectra at very low levels. The dominant components which are the toothmeshing frequencies do not contain the modulation information which is needed to describe the fault.

Separation of Bearing and Gear Faults without Turns Synchronised Averaging

It can be desirable to calculate the harmonics of the reference shaft tachometer spectrum. In the case of a varying speed machine, where resampling and alignment has been performed prior to FFT analysis, the tachometer signal spectrum will possess a first harmonic exactly on a known spectral line. For a system having 8 turns of data, the shaft speed harmonic will be on the $8^{th}$ spectral line.

For more steadily operating machines, a frequency based analysis or fixed frequency sampling method may also be used to separate bearing and gear faults.

In the case of fixed frequency sampling the tachometer spectrum often contains noise, and the exact first harmonic location may be unknown. The described embodiment employs a spectral peak based estimation technique to find the first harmonic location.

Figure 16:
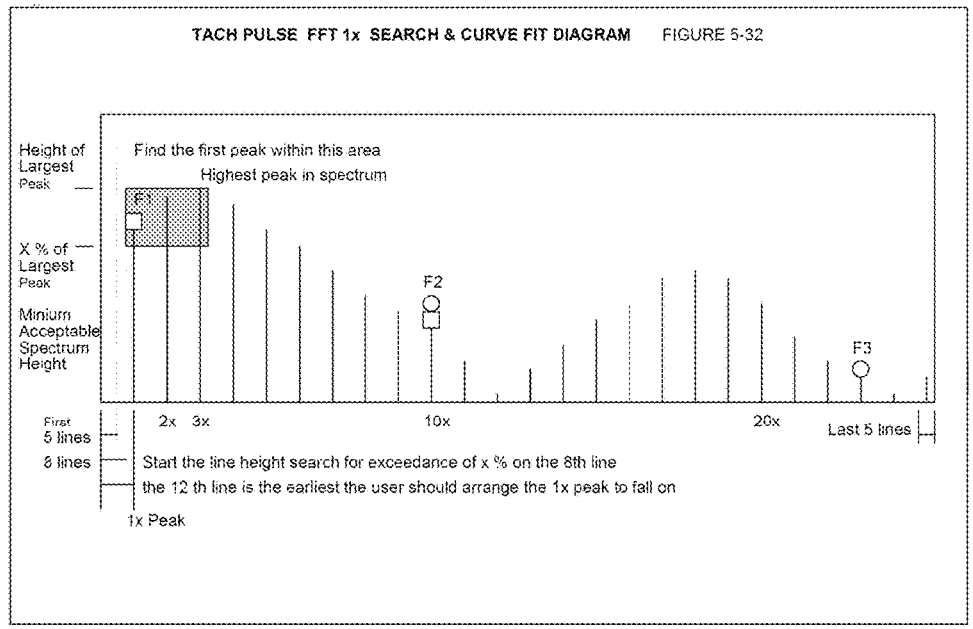
FIGS. 16 and 17 are illustrations of a graphical display window for the selection of harmonic lines on signal sensor spectra, according to one embodiment of the invention.

With reference to FIG. 16, the method involves:
identifying the highest spectral line in the tachometer spectrum, searching for a candidate first harmonic line prior to the peak of amplitude at least equal to a minimum percentage of the highest spectral value, selecting a high frequency estimation line located at a frequency of multiple M times the frequency of the candidate harmonic value, and whereby this spectral line has amplitude exceeding a minimum spectral amplitude threshold such as to avoid using noisy data, and tracing back using scale factor M to accurately find the value of the first harmonic.

The scale back process minimises error in the harmonic estimation process, in comparison to simply using the initially estimated candidate harmonic line.

The analyser module performs tachometer signal spectrum processing based on user input entered from an analysis form as shown in FIG. 16. The tachometer spectrum is shown and provides a graphical illustration of the harmonic analysis for the user. Dialog boxes allow the user to specify respective values for parameters which affects the minimum height of the desired harmonic as a percentage of the detected peak, a spectral floor which specifies the minimum spectral peak height (amplitude) that the selected high frequency estimate line can possess, and DC offset which is the raw algebraic voltage to be added to the incoming DC voltage offset to minimise it. The routine is commenced and locates the reference shaft harmonics and displays the results in the display box area.

Calculation of the first harmonic for the reference shaft tachometer signal allows the spectral locations of all the reference shaft harmonics to be determined. Using the gear ratios stored in the specification table 20, the data can be interrogated to determine the spectral harmonics of all the shafts of interest recorded in the mechanical system 10.

Given a set of harmonic locations for a shaft of interest i, line assignment is performed to identify spectral lines that correspond to each respective harmonic within both the tachometer and vibration spectra. In the described embodiment a Hanning weighting is applied to select 2 or 3 spectral lines corresponding to each harmonic. If the exact harmonic frequency is near to a spectral line, the near line and the lines on either side are selected. However, if the exact frequency is within a tolerance interval centred on the midpoint between two spectral lines then both lines are selected. Hanning based line approximation is displayed visually to the user.

Figure 18:
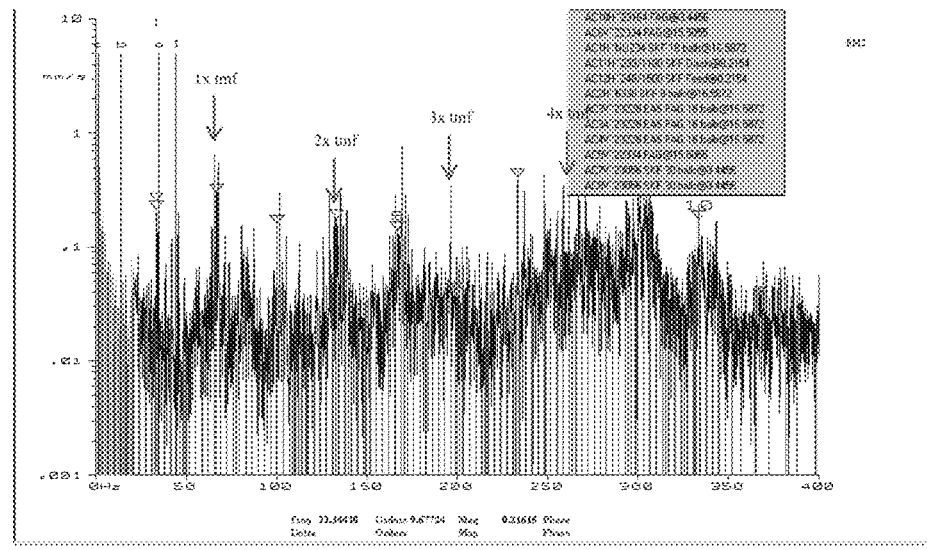
FIG. 18 is an illustration of a graphical display window for the display of analysis metrics.
Figure 19:
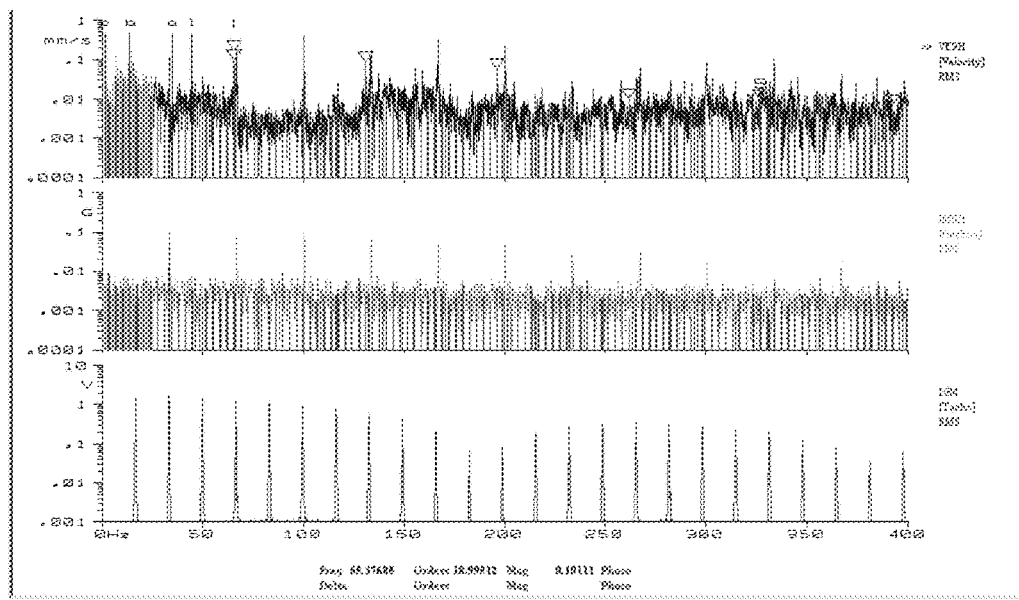
FIG. 19 is an illustration of a waveform having synchronous and non synchronous vibrations.

Referring to FIG. 19, synchronous and non-synchronous components may be identified within the tachometer and accelerometer signals for the purpose of fault detection. A comparison of the spectral lines selected for both tachometer and vibration plots allows the identification of synchronised spectral lines, which are defined as those lines commonly selected in both spectra, and non-synchronised lines which occur independently in either spectra alone without corresponding to spectra lines of known components. The inventors have observed that, as the principal difference between gear and bearing vibration is that gear meshing vibration occurs at integer multiples of the shaft speed (see FIG. 17) (i.e. at common harmonics), and bearing vibration occurs at non-integer multiples of shaft speeds (see FIG. 18), the synchronous and non-synchronous spectral components can be used as a fast and simple method of separately analysing the behaviour of these two machine sub-components. Importantly, exact characterisation of the bearings is not required for fault detection using this proposed approach.

In a preferred embodiment, the PC 40 is configured to perform identification and separation of synchronous and non-synchronous spectral components automatically.

Figure 21:
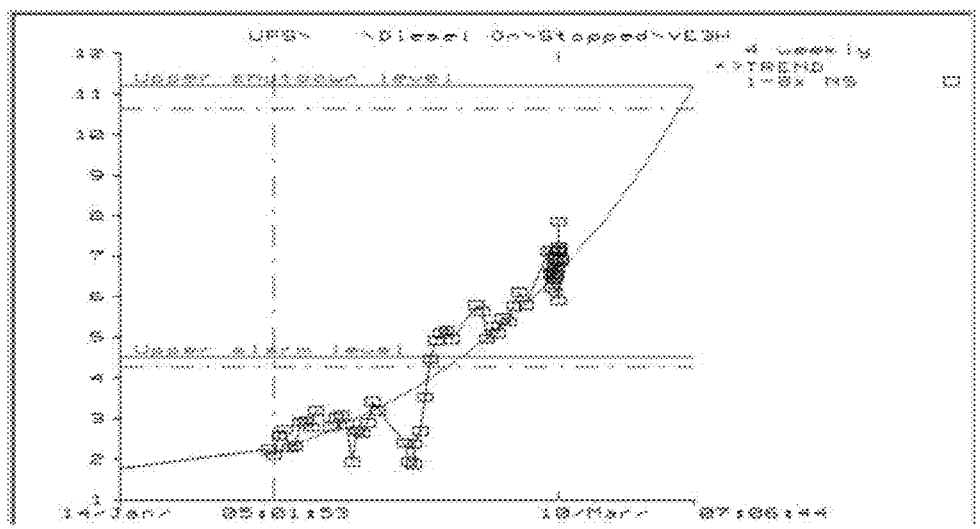
FIG. 21 is an example of the non synchronous trend in FIG. 20.

The principal difference between gear and bearing vibration is that gear meshing vibration occurs at integer multiples (harmonics) of shaft and virtual shaft speeds, and bearing vibration occurs at non-integer multiples of shaft and virtual shaft speeds. Synchronous and nonsynchronous vibration can therefore be used as a fast and simple method of separating the two in the vast majority of circumstances and most importantly exact bearing numbers for calculation of fault frequencies are not needed. The trend is shown in FIG. 21.

A secondary difference is that gears are periodic and bearings due to varying instantaneous slippage have a cyclostationary characteristic, and many extremely complex processes such as E-SANC which exist in the literature, make use of this difference. However, the inventors have found that with sufficient spectral lines, the practical difference is thought to be minimal.

A third approach, Fuzzy Logic, would require a second computer examining the database and still not keep up with the data acquisition, and would require a large number of real learning examples, which, in practice rarely exist.

The one exception to the described method is a rolling element bearing designed for pure thrust, which has identical rolling circumferences of each ring, and produces ball pass frequencies at (number of balls/2) orders, and a cage rotation frequency of (shaft speed/2).

Many normal bearings have outer ring faults very close to exact harmonics of the shaft they are mounted on, i.e. 3.02 orders, and as the harmonic orders increase so does the separation, i.e. 9.06 orders. With sufficient spectral lines they can be separated.

Looking for bearing faults based on exact calculation of frequency and corresponding spectral lines can be done mathematically, but it requires a human to allow for a whole range of errors and complexities:

different number of rollers due to brand change etc. effect the calculated frequencies:

slippage within the bearing elements reduce the frequencies;

different angular contact depending on thrust loading reduces fault frequencies; outer ring faults are generally a series of harmonics only, but can have sidebands;

inner ring faults are a series of harmonics with many sidebands of shaft speed; and ball spin frequencies with many cage speed sidebands.

The first three ruin a computed estimation of the frequencies to search for, and the last three add complexity, so searching for discrete bearing frequencies is not something that can be automated easily, quickly and effectively.

Identifying Harmonics in a Frequency Based Spectrum

Synchronous vibrations are generally caused by a gear on a shaft, for example where the teeth engage each turn repeatably, and non synchronous vibrations are generally caused by rolling element bearings because of their complex rolling actions, for instance, 5.16324 times shaft speed. The inventors realised that for machines such as gearboxes with many shafts and bearings, this logic still applies when all shaft speeds, real and virtual, were included.

To know the exact rotational speeds of all shafts, the speed ratios need to be linked by the gear tooth numbers in numerator/denominator form, as per the specification table 22 of FIG. 3, and a tachometer has to exist on one shaft, the reference shaft, preferably the highest speed shaft, which is most often the input shaft.

For fixed frequency sampling a way of precisely finding the spectral lines for all the harmonics of tachometer speed, out to the end of the measured spectrum is described with reference to FIG. 16. This method is applicable for nominally constant speed machines with minor speed variations, such as a direct online induction motor driving a fan or pump with almost constant mass flow.

The alternative of using the average of the tachometer time periods, is not accurate enough to find the highest harmonic peak in the spectrum, due to instantaneous speed wander during a turn not being fully quantified in an average, thus making the remainder of the process useless.

Knowing all the tacho shaft harmonics exactly, and knowing the exact gear ratios, the spectral lines of all harmonics of all shafts in the gearbox can be found, provided there is no floating in the gear backlash, which is generally unlikely, and no large torque variations causing significant instantaneous windup of the shafts.

A good separation of sync and non sync vibration can then be made. It will not be perfect as some vibration from a non synchronous source can by chance correspond exactly with a synchronous line of any shaft. However, this approach produces good practical separation for trending bearing and gear faults in the presence of each other at very different levels of vibration severity.

As previously described, when resampling is used (for varying speed machines), the process does not require this work on the tacho FFT, as the resampling process when using a spline fit of the time for each turn, produces a shaft speed first harmonic exactly on a known line. Calculation of all the other shaft harmonics is as previously described.

Figure 17:
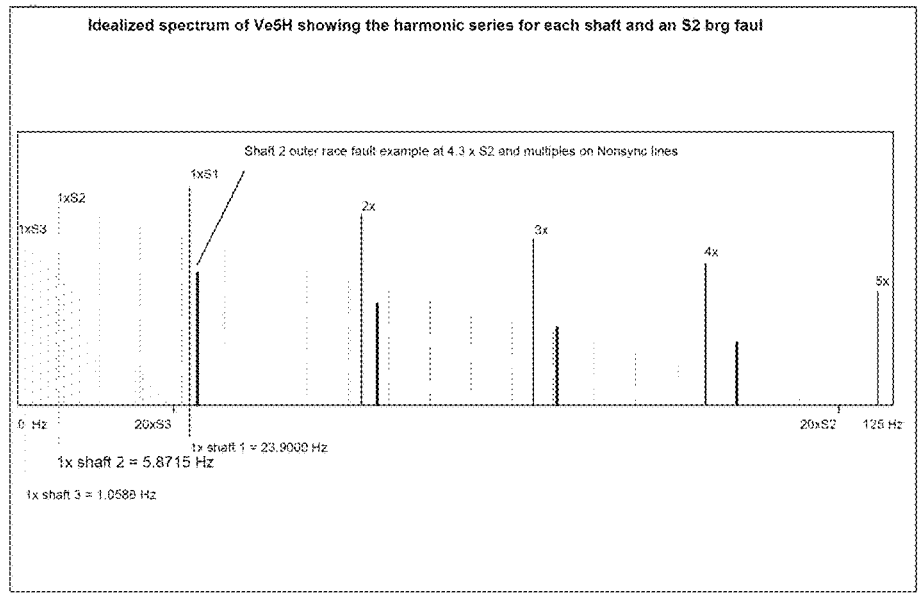

As Illustrated in FIG. 17, a poorly shaped tachometer pulse often has a 1× peak smaller than the largest peak and after viewing the spectrum a logical % of the max peak height can be keyed in to miss any background noise and yet still find a small 1× peak.

A parameter "Search % 1×" is used, which specifies the minimum height of the first harmonic as a percentage of the highest harmonic in the spectrum such that the first harmonic can be found even if it is not the largest.

A parameter "Min Harm Level" can then be used, which specifies the minimum spectral peak height that can be used in the 1× search process to avoid using noise data.

The following process can then be used to find all the harmonics of shaft speed:
- when using a Hanning window and the possibility of a DC coupled spectrum, the user should choose FFT line numbers and a frequency range to place the approximately known 1st harmonic on line 6 or higher,
- find the 1× peak using Search %;
- apply a peak fitting routine to find the decimal line value of the peak;
- multiply the peak value by a maximum of 10 (to minimize smearing effects on the peaks from speed wander) and search for a peak greater than the Min Harmonic Level;
- if a peak with a multiple of around 10 cannot be found then a check for a peak with a multiple of around is conducted until a peak can be found; and
- apply a peak fitting routine to that peak to find the decimal line value of the peak and divide by it's harmonic number to get a more accurate value for 1×.

The process includes multiplying the 1× value by nominally 100 times and searching for a peak greater than the Min Harmonic Level. If a peak around 100 times cannot be found check around 99 time etc, until a peak can be found. Apply a peak fitting routine to that peak to find the decimal line value of the peak and divide by it's harmonic number to get a more accurate value for 1×.

Continue the process to the highest harmonic in the spectrum greater than the Min Harmonic Level. At this stage all the tacho shaft speed harmonics are known to a decimal of a spectral line. If the 1× line is less than 6 reject the measurement. Using the gear tooth numbers for each shaft, the harmonics of all shafts can thus be known.

Calculation & Display of Synchronous & Nonsynchronous Vibration

The inventors have found that the only reliable and accurate way to analyse synchronous vibration is to simultaneously measure vibration and tachometer pulse waveforms.

If the data is desired to be left in the frequency domain, a FFT of both waveforms is performed and then a curve fit applied to all the peaks in the tachometer FFT which identifies the synchronous spectral lines, which are common to both FFT waveforms.

If data is to be resampled into the "orders" domain then the vibration 1× shaft speed peak is an integer value, the same as the number of turns acquired in the data sample. The peaks are symmetrical. The average speed for the whole data sample is approximated as the average of the speed of all turns and the 1× order is labelled as this speed, thus scaling the whole spectrum.

Shafts geared to the tacho shaft by non integer ratios have harmonics that are decimal numbers and produce asymmetrical peaks.

A software program is provided which allows modifications to the spectrum. When using Hanning weighting each harmonic is painted (highlighted) 2 or 3 lines wide depending on the exact frequency. If the exact frequency is near a spectral line that line and the line either side are painted, for a total of 3 painted lines, if the exact frequency is midway between 2 spectral lines +/−10% we paint both lines, for a total of 2. This fast approximation produces close to theoretically correct values of vibration of each harmonic and maximizes the remaining non sync lines in the spectrum.

For velocity and demodulated spectra, we visually paint the synchronous lines of each shaft harmonic series in different colours. With three or more shafts, virtually all the spectral lines would now be painted across the whole spectrum leaving no non-synchronous data lines.

For gearboxes the velocity and demodulated frequency ranges are set to allow about 100 harmonics of shaft speed at each bearing and use at least 3200 lines where possible, for adequate resolution.

Shaft vibration velocity level rolls off with frequency and at about 100 orders it is minimal so if we limit the calculation and painting to 100 orders of each shaft it leaves significant non-sync lines in the high end (¾) of the spectrum where bearing faults can be detected in the presence of gear faults at that measurement point. More or less lines and orders can be used, and the painted range can be adjusted as required.

This range allows around 4 harmonics of the tooth meshing frequency of the pinion on the shaft in this bearing and around 15 harmonics of inner and outer race faults of this bearing.

By using a similar number of orders of each shaft of interest as it is measured, these ratios are preserved. This provides ideal resolution for faults on the shaft of interest, as the higher speed shaft harmonics, bearing and gear faults move up, out of the spectrum range. Harmonics of lower shafts are limited to the lower frequency range in the spectrum, in proportion to their ratio FIG. 19 illustrates a spectrum for a Sag mill with gear and bearing faults. The spectrum Sync lines are colour coded for each shaft speed. The first 4 harmonics of the tooth meshing frequency of the mill pinion are further highlighted.

The outer ring fault calculation is for final visual confirmation, not detection of the bearing fault. The outer ring fault harmonics are slightly lower than calculated frequency. The outer ring harmonics rarely overlay shaft harmonics. In this case the outer ring harmonics also have sidebands which rarely overlay shaft harmonics.

If the major peaks are all highlighted synchronous lines, a likely shaft or gear related fault is dominant. If the major peaks are not highlighted synchronous lines, i.e., blue, it's a likely bearing related fault.

To manually confirm a faulty bearing a user can select the number of a bearing to superimpose on the spectrum, and visually check the "fit".

Trend parameters for Synchronous and Non-Synchronous Vibration in a Band

Bands (frequency or orders) are defined across the spectrum, which are likely to contain particular faults. In the case of gears and bearings the range is similar but they are separated by the characteristic of whether they are synchronous or non synchronous with respect to each shaft speed.

Figure 20:
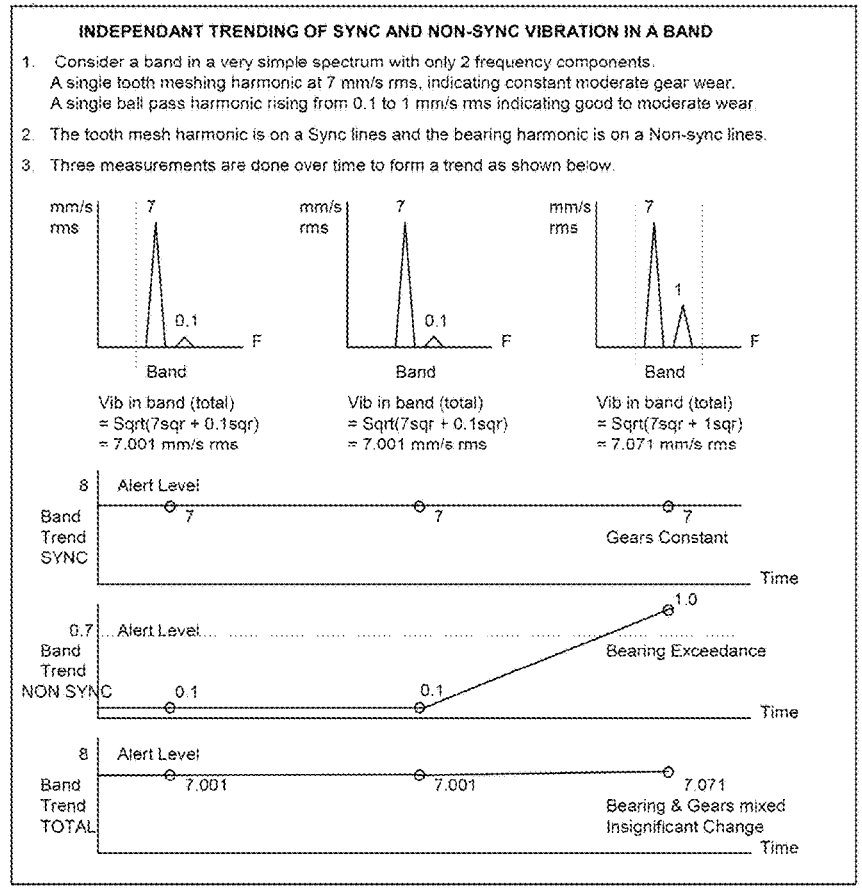
FIG. 20 illustrates a method of tending synchronous and non-synchronous vibration.

The example of FIG. 20 shows a big change in the non-synchronous vibration trend despite the value being small compared to the synchronous vibration, and that the overall vibration barely changes as the fault increases.

To enable automatic trending of specific fault types, each measurement is divided up into various frequency ranges, and then subdivided into synchronous and non-synchronous, which can be interpreted with reference to the following example:

RMS O/all(Vel) A general level of vibration for rough determination of low freq, severity.

Sub Sync.(Vel) Less than 0.8× shaft speed, process vibration, looseness, harmonics of belt rotation.

1× sync (Vel) Imbalance always at 1× shaft speed, misalignment 70% chance, also both.

2× sync (Vel) Misalignment 100%, except 2 lobe roots blowers & reciprocating machines.

1-8× non sync (Vel) Process vibration, 1× & 2× "ball pass frequency", harmonics of belt rotation.

3-8× sync (Vel) Looseness, porting pulsation's of roots blowers, blade pass vibration of pumps.

9-128× sync (Vel) Gear faults 4 harmonics of mesh, vac pump blade pass & roots blower pulses.

9-128× non sync (Vel) Bearing faults, 2 to 20 harmonics of bearing faults (separates brg & gear vib).

Peak-peak O/all (Vel) Sensitive to looseness impacts and total deflection of machine/foundation.

RMS O/all(Acc) A general level of vibration for rough determination of high frequency severity.

0.1-3 kHz (Ace) Gear vibration but can be bearing track faults when gears not present.

3-16 kHz (Acc) Poor lubrication, bearing track faults, can be very high harmonics of gear mesh.

16-32 kHz (Acc) Poor lubrication, metal to metal contact in bearings, gear mesh & hyd pulsations.

Peak-peak O/all (Acc) Sensitive to impacts, bearing faults, shaft rubs & single tooth gear faults.

There are also more complex bands, i.e. for electric motor analysis (number of rotor bars and associated 2× line frequency sidebands) indicating a rotor/stator problem.

There are also more complex bands, i.e. For single tooth gear faults which use complex formulas in the time or turns domain in FIG. 20, i.e. FM4. FM4P2P and the combination of alarms in both.

Alarm Limits for all Spectral Bands and Waveform Characteristics

There are only general ways of defining acceptable vibration limits for a class of machines because we are trying to estimate the forces causing the damage, when we only have vibration to measure. Vibration response in mm/s is equal to input forces in N times modal parameters in N/(mm/s) across the spectrum.

Setting alarm limits, for each band of each measurement, for each of dozens of machines, and changing them as needed, requires a large amount work and should preferably be automated.

Because the same measurement point on two machines of the same design may have significantly different vibration levels for a similar condition, each measurement point appears to need a unique trend set which could number 1000's.

Each machine measurement point has a link to a generic trend set and a set of multipliers, for each column of that set, thereby allowing a small number of sets to work with a large number of measurements. This unique approach is highly beneficial.

The parameter bands discussed above are shown in FIGS. 22, 21 and 24 and each has a reasonable vibration level filled in for each. Theoretically they could all be nominally 1, for instance. The bands can be defined in orders or frequency.

Figures 24, 25:
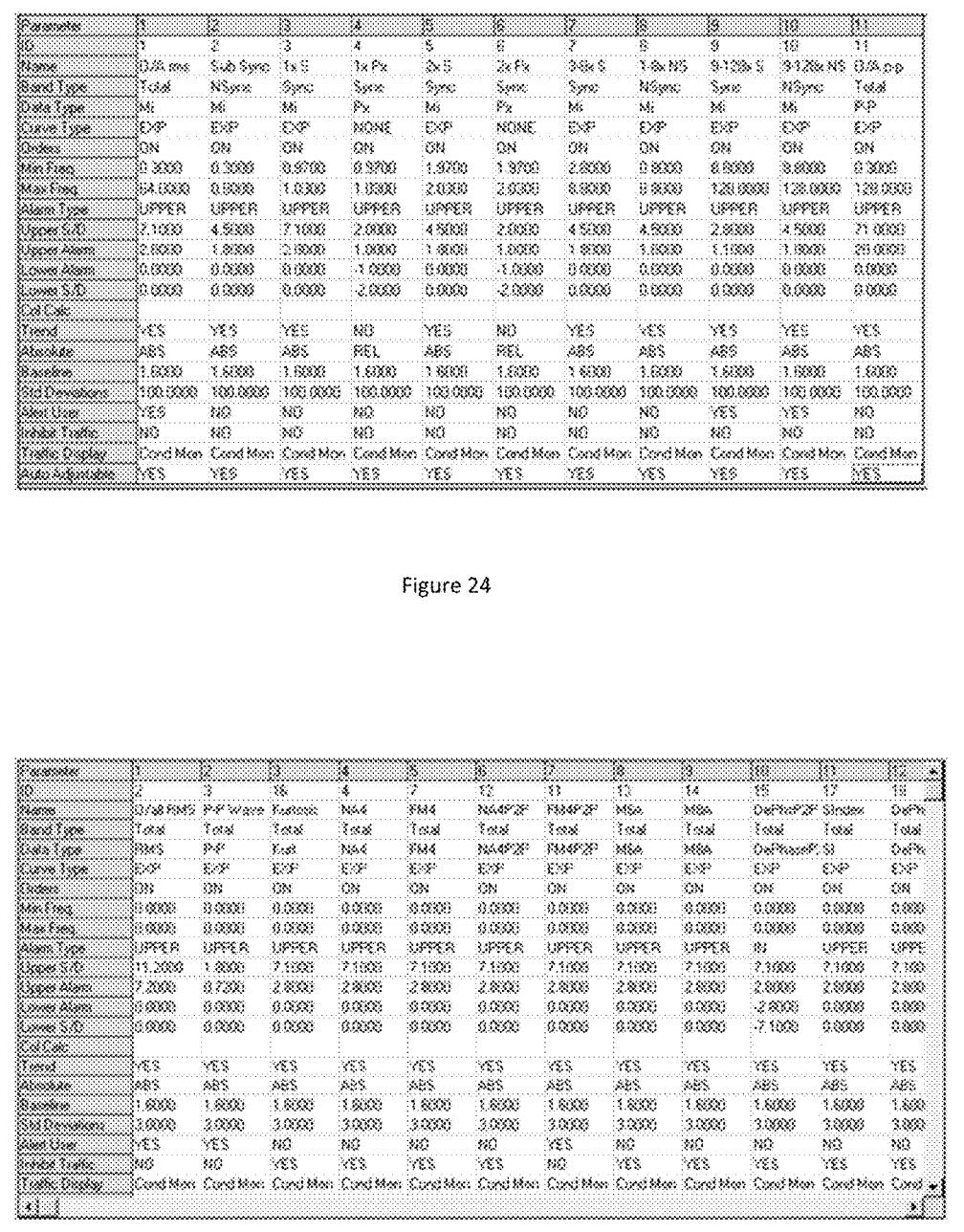

When the machine is first measured the analyst has to decide if the machine is in reasonable condition, by visually checking all data, and if so, the just measured vibration in each band is considered as a reference and a base line ratio is applied, 4 dB=1.6× for the alarm limit and a further 8 dB=2.5× for the shutdown limit. FIG. 24 illustrates a preferred user interface that allows for adjustment alternatives to a complete machine at a mouse click. Again, this unique approach is highly beneficial as it allows automatic changes to all appropriate trend parameters.

The 4 dB change catches minor changes early to allow the system to give maximum planning time if needed, and the 8 dB change catches significant changes that need serious investigation. A third level can be added with an additional 4 dB to indicate urgent action is required.

When a machine has deteriorated or been fixed a huge number of parameters change and individual adjustment is not realistic. Once again the analyst has to decide if the machine is in reasonable condition, by visually checking all data, and either raise the alarm limits or stop the machine. For each measurement point, each parameter has it's multiplier changed to produce a "new" 4 and 8 dB clearance, depending on the change choice made.

The method discussed above under the heading quality control and sensor fault tolerance can be used to prevent false alarms from faulty data When an acceleration signal fails the waveform median filter test, or a velocity signal fails the spectrum 1/f test, there is excessive noise at the low frequency end of the spectrum, but there may still be some good trend data available from the higher frequency end.

To retain the partly damaged data and also prevent false trend alarms we have introduced the concept of a Trend Inhibit Frequency. Typically the noise extends from dc to around 15 Hz, and this upper value is adjustable for each measurement. The only valid trend data parameters are those which do not contain dc to 15 Hz frequency ranges in their frequency or orders specification.

With reference to FIG. 21, identification of gear faults is possible through an examination of metric behaviour over time. For each metric, and relative to each sensor type, a plurality of threshold values may be defined. The threshold values represent the highest value expected of the metric when the system is operating under nominal conditions (i.e. in the absence of a gear fault on the shaft of interest). Recorded metric values which exceed the threshold may be identified by the analyser for alert of the user.

Figures 22, 23:
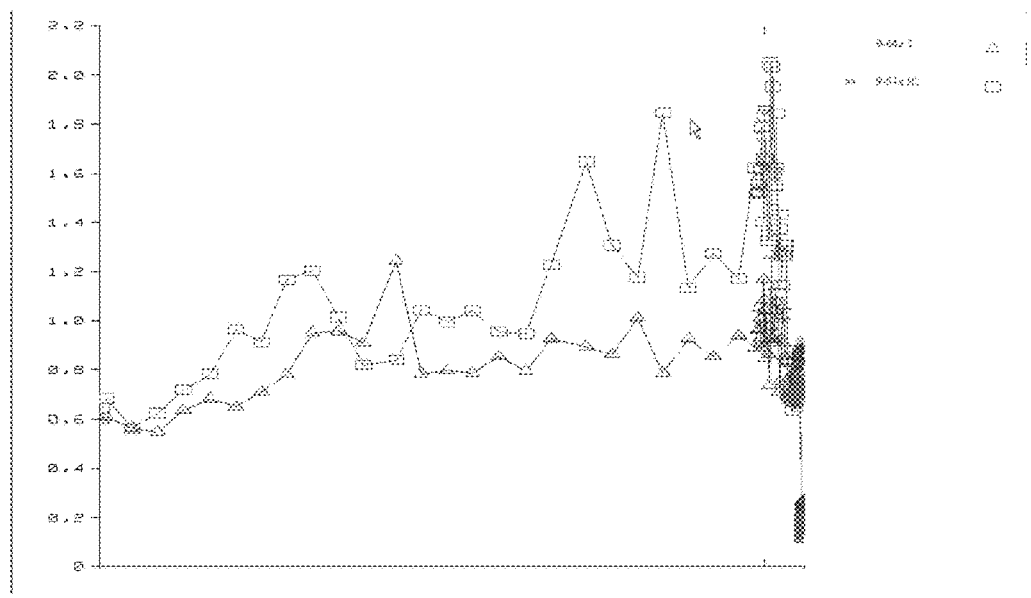
FIGS. 22 to 23 illustrate reasonable parameter bands for vibration levels.
Figures 26, 27:
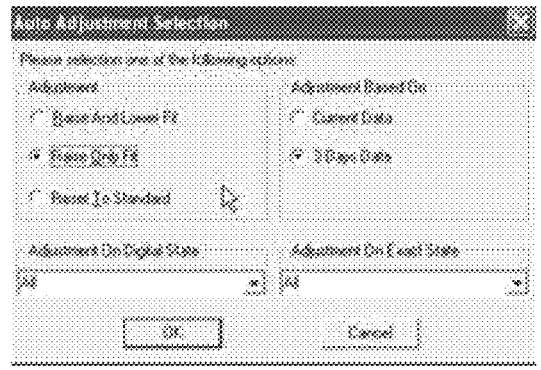
Figure 30:
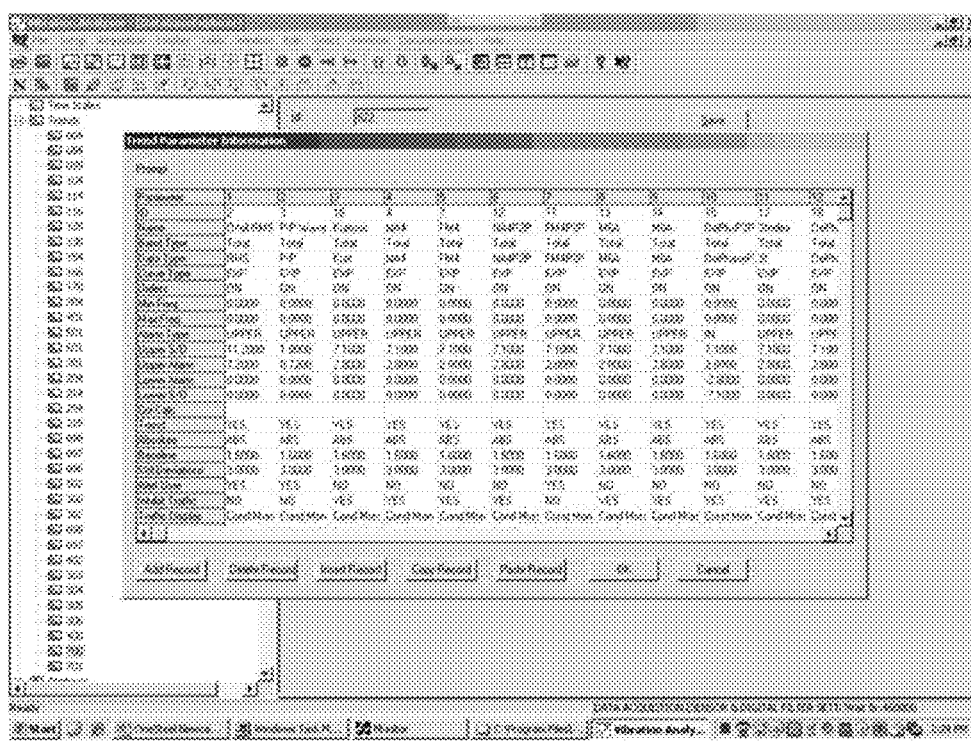

The user interface of FIGS. 22 and 23 allows the user to view each metric value over time. A graphical representation can be provided, such as FIG. 21 for example, for the metric of choice over the time interval of the recorded data present, specific to the system and shaft combination. The displayed data points can correspond to sampled values, shutdown and alarm threshold value levels and a best fit curve reflecting the trend in the data values. The user may configure additional display options including adjustment of the time scale for which data points are shown, selection of the best fit curve function, and adjustment of the metric amplitude scale.

The recorded and displayed time series data for the analysis metrics may be used in the described embodiment to detect the presence of faults on the gear of the shaft of interest. In the embodiment presented automatic detection of imbalance, misalignment, looseness, bearing faults, gear profile faults and gear single tooth faults are based on the trend limits shown in FIGS. 22, 23, 24. The inventors have discovered that velocity NA4 and FM4 metrics showing an increase over time characterise general gear faults for the shaft. Gear tooth variation is indicated by an increase in the peak-to-peak value.

In this specification and the claims that follow, unless stated otherwise, the word "comprise" and its variations, such as "comprises" and "comprising", imply the inclusion of a stated integer, step, or group of integers or steps, but not the exclusion of any other integer or step or group of integers or steps.

References in this specification to any prior publication, information derived from any said prior publication, or any known matter are not and should not be taken as an acknowledgement, admission or suggestion that said prior publication, or any information derived from this prior publication or known matter forms part of the common general knowledge in the field of endeavour to which the specification relates.

The invention claimed is:

1. A method of measuring and analyzing vibrations of a mechanical system having a reference shaft and a plurality of rotating components, including the steps of:

tabulating in a specification table, gear ratios of the plurality of rotating components relative to the reference shaft in integer form;

establishing a measurement specification and communicating the measurement specification to a digitizer, the measurement specification including a sample rate at which vibration data is to be recorded and operating conditions of the mechanical system that are to be met before vibration data pertaining to the mechanical system is recorded;

recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components; and resampling the recorded vibration data using the gear ratios defined in a specification table to obtain vibration data corresponding to the plurality of rotating components or each of the plurality of rotating components, wherein from the step of resampling there is obtained for analysis a vibration signature for a component of interest at predetermined angular increments, wherein the step of resampling includes resampling sampled time-domain signal data to generate resampled signals with a fixed number of data points per revolution of a shaft to be analyzed, and wherein the resampling is performed by:

applying a cubic Hermite spline function to a position map of the reference shaft to produce a series of resample time instants within an interval of one revolution of a shaft to be analyzed, from a set of values obtained from measured signal values obtained over a plurality of revolutions of the shaft to be analyzed; and interpolating a resampled signal value at each of the resample time instants.

2. The method according to claim 1, further including the step of tabulating a representation of virtual shafts for epicyclic gears.

3. The method according to claim 2, wherein a virtual shaft gear ratio is calculated as a number of teeth on a ring gear, divided by a sum of the number of teeth on the ring gear and a number of teeth on a sun gear.

4. The A method according to claim 1, further including the step of tabulating a number of rolling elements of bearings in the mechanical system.

5. The method according to claim 1, wherein when the mechanical system is periodically loaded, the measurement specification is configured so that the digitizer captures data corresponding to the mechanical system when loaded so as to capture data for a predetermined number of turns of a shaft of interest to be analyzed, and wherein the sampling rate of the measurement specification is determined from a minimum sampling frequency based on digitizer-measured speed of the shaft of interest, rounded up to a nearest higher binary range, to allow for oversampling.

6. The method according to claim 5, wherein the measurement specification includes operating conditions for the mechanical system and once speed and load conditions are satisfied and a predetermined number of turns of the reference shaft have passed, the digitizer:

acquires data samples for a predetermined number of turns of the reference shaft based on the measurement specification and a gear ratio of the shaft of interest;

acquires at least 256 data samples on each end of recorded data to fill digital filtering buffers; and checks that the load conditions are still above a predetermined level at an end of sampling.

7. The method according to claim 1, further including generating one or more analysis metrics by averaging the sampled signal data values, for a shaft of interest, over a fixed number of turns of the shaft of interest.

8. Non-transitory computer readable medium containing computer instructions stored therein for causing a computer processor to execute the method according to claim 1.

9. The method according to claim 1, wherein the first sensor is a tachometer.

10. The method according to claim 1, wherein at least one of the one or more vibration sensors is an accelerometer.

11. A method of measuring and analyzing vibrations of a mechanical system having a reference shaft and a plurality of rotating components, including the steps of:
  tabulating, in a specification table, gear ratios of the plurality of rotating components relative to the reference shaft in integer form;
  establishing a measurement specification and communicating the measurement specification to a digitizer, the measurement specification including a sample rate at which vibration data is to be recorded and operating conditions of the mechanical system that are to be met before vibration data pertaining to the mechanical system is recorded;
  recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components,
  wherein the step of recording vibration data includes a subroutine for checking operation of sensors within predetermined operating conditions, the subroutine including the steps of:
    integrating an acceleration waveform of the recorded vibration data to velocity to amplify transient oscillations of the acceleration waveform;
    filtering the velocity waveform in the time domain using a two pole Butterworth filter or a drift filter to reduce resulting transients;
    applying a damped exponential filter function to further remove transients; and
    differentiating the velocity waveform to return it to an acceleration waveform; and
  resampling the recorded vibration data using the gear ratios defined in the specification table to obtain vibration data corresponding to the plurality of rotating components or each of the plurality of rotating components,
  wherein from the step of resampling there is obtained for analysis a vibration signature for a component of interest at predetermined angular increments.

12. The method according to claim 11, wherein the first sensor is a tachometer.

13. The method according to claim 11, wherein at least one of the one or more vibration sensors is an accelerometer.

14. A method of measuring and analyzing vibrations of a mechanical system having a reference shaft and a plurality of rotating components, including the steps of:
  tabulating, in a specification table, gear ratios of the plurality of rotating components relative to the reference shaft in integer form;
  establishing a measurement specification and communicating the measurement specification to a digitizer, the measurement specification including a sample rate at which vibration data is to be recorded and operating conditions of the mechanical system that are to be met before vibration data pertaining to the mechanical system is recorded;
  recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components; and
  resampling the recorded vibration data using the gear ratios defined in the specification table to obtain vibration data corresponding to the plurality of rotating components or each of the plurality of rotating components,
  wherein from the step of resampling there is obtained for analysis a vibration signature for a component of interest at predetermined angular increments; and
  isolating vibrations from a rotating component to be analyzed by removing from the recorded vibration data waveform components corresponding to vibrations of mating components, including the steps of:
    obtaining a vibration waveform of the mechanical system and performing a FFT operation on the vibration waveform;
    identifying a rotating mating gear for which harmonics of the vibration waveform of the mating gear are to be removed; and
    removing or minimizing the harmonics to a background level.

15. A method of measuring and analyzing vibrations of a mechanical system having a reference shaft and a plurality of rotating components, including the steps of:
  tabulating, in a specification table, gear ratios of the plurality of rotating components relative to the reference shaft in integer form;
  establishing a measurement specification and communicating the measurement specification to a digitizer, the measurement specification including a sample rate at which vibration data is to be recorded and operating conditions of the mechanical system that are to be met before vibration data pertaining to the mechanical system is recorded;
  recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components; and
  resampling the recorded vibration data using the gear ratios defined in the specification table to obtain vibration data corresponding to the plurality of rotating components or each of the plurality of rotating components,
  wherein from the step of resampling there is obtained for analysis a vibration signature for a component of interest at predetermined angular increments; and
  identifying a rotating component fault in a waveform, including:
    trending a FM4 peak to peak value of the waveform; and
    triggering an alarm once the FM4 peak to peak trended value exceeds a predetermined level.

16. A method of measuring and analyzing vibrations of a mechanical system having a reference shaft and a plurality of rotating components, including the steps of:
  tabulating, in a specification table, gear ratios of the plurality of rotating components relative to the reference shaft in integer form;
  establishing a measurement specification and communicating the measurement specification to a digitizer, the measurement specification including a sample rate at which vibration data is to be recorded and operating conditions of the mechanical system that are to be met before vibration data pertaining to the mechanical system is recorded;

recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components; and resampling the recorded vibration data using the gear ratios defined in the specification table to obtain vibration data corresponding to the plurality of rotating components or each of the plurality of rotating components, wherein from the step of resampling there is obtained for analysis a vibration signature for a component of interest at predetermined angular increments; and performing a subroutine of retrieving a force waveform from a vibration response waveform, including the steps of:

obtaining a system response spectrum;

identifying gear meshing harmonics from the system response spectrum;

deleting gear meshing harmonics from the system response spectrum;

calculating a Cepstrum from the spectrum and applying a lifter to remove components corresponding to system response; and applying an inverse FFT routine to obtain a waveform of a forcing impulse.

17. A method of measuring and analyzing vibrations of a mechanical system having a reference shaft and a plurality of rotating components, including the steps of:

tabulating, in a specification table, gear ratios of the plurality of rotating components relative to the reference shaft in integer form;

establishing a measurement specification and communicating the measurement specification to a digitizer, the measurement specification including a sample rate at which vibration data is to be recorded and operating conditions of the mechanical system that are to be met before vibration data pertaining to the mechanical system is recorded;

recording data from the mechanical system during operation, the data comprising rotational speed of the reference shaft received from a first sensor operatively coupled to the reference shaft and vibration data received from one or more vibration sensors operatively coupled to one or more of the reference shaft and the plurality of rotating components;

identifying and separating synchronous and non-synchronous components from sampled signal values via harmonic analysis;

determining gearing vibration characteristics based on the identified synchronous component; and determining bearing vibration characteristics based on the identified non-synchronous component.

18. A vibration measurement and analysis system for a mechanical system having a reference shaft and a plurality of rotating components including:

a sensor operatively coupled to the reference shaft for obtaining rotation speed thereof;

one or more vibration sensors attached to one or more of the reference shaft and the plurality of rotating components for recording vibration measurements of the system, the vibration measurements being represented by one or more signals;

a data collection device for recording in integer form gear ratios of the plurality of rotating components relative to the reference shaft and for recording the one or more signals with reference to the recorded gear ratios;

an automated analysis and display device for generating one or more analysis metrics from the signals, the device being configured to obtain vibration information for a shaft of interest based on the vibration measurements with reference to recorded gear ratios, wherein the one or more analysis metrics are used to identify a presence of gear or bearing faults within the rotating components of the mechanical system, for which the signals are recorded, by:

determining gearing vibration characteristics based on a synchronous component of the analysis metrics, determining bearing vibration characteristics based on a non-synchronous component of the analysis metrics; and a transmission medium for transmission of the signals to at least one of a digitizer unit and the automated analysis and display system.

19. Non-transitory computer readable medium containing computer instructions stored therein for implementing on the automated analysis and display device of claim 18.

20. The system according to claim 18, wherein at least one of the one or more sensors is an accelerometer.

* * * * *